(12) United States Patent
Tanimoto

(10) Patent No.: US 11,412,183 B2
(45) Date of Patent: Aug. 9, 2022

(54) MANAGEMENT SERVER, MANAGEMENT SYSTEM, MANAGEMENT METHOD, AND PROGRAM

(71) Applicant: MURATA MACHINERY, LTD., Kyoto (JP)

(72) Inventor: Yoshifumi Tanimoto, Kyoto (JP)

(73) Assignee: MURATA MACHINERY, LTD., Kyoto (JP)

( * ) Notice: Subject to any disclaimer, the term of this patent is extended or adjusted under 35 U.S.C. 154(b) by 321 days.

(21) Appl. No.: 16/761,276

(22) PCT Filed: Nov. 8, 2018

(86) PCT No.: PCT/JP2018/041500
§ 371 (c)(1),
(2) Date: May 4, 2020

(87) PCT Pub. No.: WO2019/098119
PCT Pub. Date: May 23, 2019

(65) Prior Publication Data
US 2020/0389626 A1    Dec. 10, 2020

(30) Foreign Application Priority Data
Nov. 15, 2017 (JP) .............................. JP2017-219872

(51) Int. Cl.
*H04L 67/12* (2022.01)
*H04N 7/18* (2006.01)
(Continued)

(52) U.S. Cl.
CPC .............. *H04N 7/181* (2013.01); *G16Y 40/10* (2020.01); *G16Y 40/35* (2020.01);
(Continued)

(58) Field of Classification Search
CPC .... G16Y 40/10; G16Y 40/35; H04L 67/1046; H04L 67/1097; H04L 67/12; H04L 67/535; H04L 67/561; H04N 5/272; H04N 7/181
See application file for complete search history.

(56) References Cited

U.S. PATENT DOCUMENTS

2006/0282498 A1 * 12/2006 Muro ...................... H04L 67/12
709/203
2013/0027561 A1    1/2013 Lee et al.
(Continued)

FOREIGN PATENT DOCUMENTS

JP      2010-238184 A    10/2010
JP      2016-052919 A    4/2016

*Primary Examiner* — Jason D Recek
(74) *Attorney, Agent, or Firm* — Keating & Bennett, LLP

(57) ABSTRACT

A management server, which facilitates search for information, includes storages, a network interface, and a processor. The network interface performs communication with an external device. The processor is configured or programmed to perform a process of associating monitoring target information, sensor information, and time information, with one another to be stored in the storage. Further, the processor is configured or programmed to perform a process of receiving designation information from a host controller, and combining the monitoring target information corresponding to the obtained designation information with the sensor information associated with the monitoring target information to generate combined information and output the combined information to the host controller.

10 Claims, 32 Drawing Sheets

(51) Int. Cl.
*G16Y 40/10* (2020.01)
*G16Y 40/35* (2020.01)
*H04N 5/272* (2006.01)
*H04L 67/104* (2022.01)
*H04L 67/561* (2022.01)

(52) U.S. Cl.
CPC .......... *H04L 67/1046* (2013.01); *H04L 67/12* (2013.01); *H04L 67/561* (2022.05); *H04N 5/272* (2013.01)

(56) References Cited

U.S. PATENT DOCUMENTS

| | | |
|---|---|---|
| 2015/0206081 A1 | 7/2015 | Lee et al. |
| 2015/0208043 A1 | 7/2015 | Lee et al. |
| 2018/0067995 A1* | 3/2018 | Ishii ...................... H04L 43/106 |
| 2019/0138487 A1* | 5/2019 | Burtch ................ G06F 13/4221 |

* cited by examiner

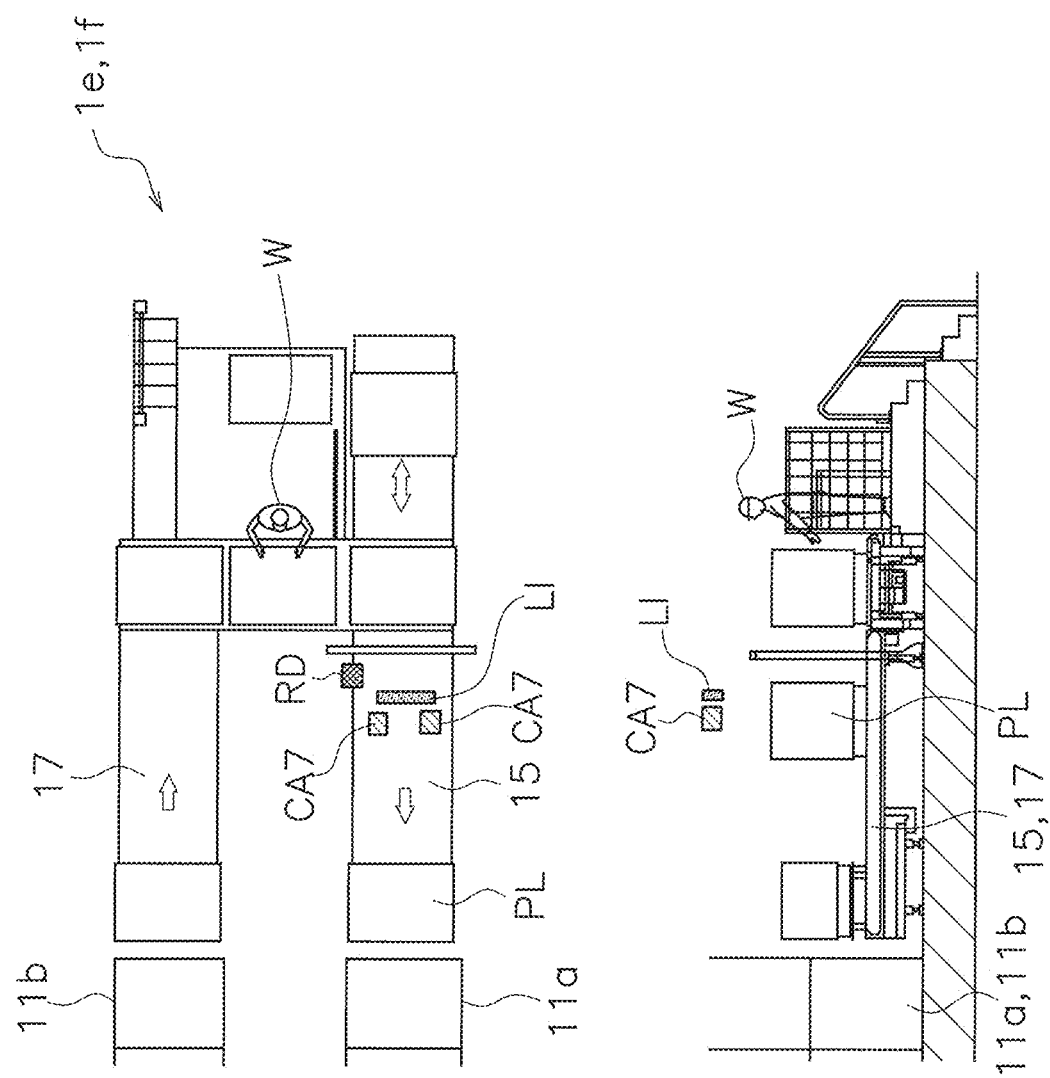

FIG. 17

| | Occurrence date and time | Facility section | Control block | Abnormality content | Image |
|---|---|---|---|---|---|
| 78 | 2015/12/21 21:03:58 | conveyor | 610X10010400 | 0199: | |
| 79 | 2015/12/21 21:03:58 | conveyor | 610X10010300 | 0199: | |
| 80 | 2015/12/21 21:03:57 | conveyor | 610X10010200 | 0199: | |
| 81 | 2015/12/21 21:03:57 | conveyor | 610X10010100 | 0199: | |
| 82 | 2015/12/21 19:25:22 | SLX | 450511150000 | 0199: | |
| 83 | 2015/12/21 19:25:07 | SLX | 450511140000 | 0199: | |
| 84 | 2015/12/21 19:18:42 | SLX | 450511130000 | 0199: | |
| 85 | 2015/12/21 19:18:36 | SLX | 450511120000 | 0199: | |
| 86 | 2015/12/21 19:18:30 | SLX | 450511110000 | 0199: | |
| 87 | 2015/12/21 19:17:54 | SLX | 450511120000 | 9101: bumper stop | |
| 88 | 2015/12/21 19:17:51 | SLX | 450511130000 | 9101: bumper stop | |
| 89 | 2015/12/21 19:15:45 | SLX | 450511130000 | 9101: bumper stop | |
| 90 | 2015/12/21 19:15:44 | SLX | 450511120000 | 9101: bumper stop | |
| 91 | 2015/12/21 17:36:09 | SLX | 450511130000 | 9001: emergency stop | |
| 92 | 2015/12/21 17:35:59 | SLX | 450511110000 | 9001: emergency stop | |
| 93 | 2015/12/21 17:35:47 | SLX | 450511120000 | 9001: emergency stop | |
| 94 | 2015/12/21 17:35:41 | SLX | 450511120000 | 9001: emergency stop | |
| 95 | 2015/12/21 16:02:51 | SLX | 450511150000 | 0199: | |

Trouble occurrence report

| | | | Page 1 |
|---|---|---|---|
| Facility name | ** ELECTRIC Co., Ltd, Kyoto Logistics Center | | |
| Occurrence date and time | 2015/12/08 15:43:22 | | |
| Occurrence place | Shuttle A | | |
| Trouble content | | | |

| | | | |
|---|---|---|---|
| Facility area | A10011 | Shuttle A, storage area | |
| Control section | △□ | ** MACHINE | |
| Apparatus ID | UNI1001 | Shuttle A | |
| Machine No./block ID | 1 | | |
| Occurrence point | UNI10010203 | | |
| Error code | 999999 | | |

| | | | |
|---|---|---|---|
| Tray ID | A10011 | | |
| Conveyance data No. | 12345678 | Shipment group No. | 9999999999999999999 |
| Conveyance group No. | 001 | Supplemental information 1 | |
| Conveyance order No. | 001 | Supplemental information 2 | |
| | | Supplemental information 3 | |
| | | Supplemental information 4 | |

Trouble occurrence situation

CameraID #1   xxxxxx   HH:MM:SS

CameraID #2   xxxxxx   HH:MM:SS

CameraID #3

CameraID #4

FIG. 25A

| Trouble occurrence report | Page 2 |
|---|---|
| Facility name | ** ELECTRIC Co., Ltd, Kyoto Logistics Center |
| Occurrence date and time | |
| Occurrence place | |
| Trouble content | |

Check items

② Press MANUAL

Restoration procedure

Follow the steps below to delete data:
① Press mode selection of the machine in mode selection menu (IMG_0412)
② Press MANUAL (IMG_0413)
③ press MAIN (IMG_0414)
④ Press the machine (IMG_0415)
⑤ Press conveyance data check (IMG_0416)
⑥ Press DELETE (IMG_0417)
⑦ Press YES (IMG_0420)
* Later, perform operation of automatic, preparation for operation, and start

IMG_0412    IMG_0413    IMG_0414    IMG_0415

IMG_0416    IMG_0417    IMG_0420

FIG. 25B

MANAGEMENT SERVER, MANAGEMENT SYSTEM, MANAGEMENT METHOD, AND PROGRAM

BACKGROUND OF THE INVENTION

1. Field of the Invention

The present invention relates to a management server that manages information about a system including sensors located at a plurality of positions, a management system including the management server, a management method of information in the management server, and a non-transitory computer readable medium including a program that causes a computer to execute the management method.

2. Description of the Related Art

Conventionally, it is known to collect, via a network, information obtained from sensors included in a device, so that the information is used to monitor the device or other purpose (Internet of Things (IoT) technology). For example, JP-A-2016-52919 discloses a management device that manages images taken by a camera equipped to a carrier vehicle in a carrier vehicle system. In this management device, the image is managed in association with time, and the image taken at designated time is displayed on a display.

As the scale of the system increases, the number of equipped sensors, for example, cameras, increases, and the number of devices installed in the system and the number of objects to be handled also increase. As a result, if the system managed by the management device is a large scale, search for desired information at one time is complicated and requires a lot of effort. It is because when the numbers of sensors, devices, and/or objects to be handled increase, the number of information obtained in the entire system and the number of information obtained at substantially the same time are increased.

SUMMARY OF THE INVENTION

Preferred embodiments of the present invention facilitate the search for information in a management server that manages information about a system including a plurality of sensors.

Hereinafter, various preferred embodiments of the present invention are described, and features or elements of the various preferred embodiments are able to be arbitrarily combined, for example.

A management server according to a preferred embodiment of the present invention is a server that manages information about a system including sensors located at a plurality of positions. The management server includes a storage or memory, a network interface, and a processor. The network interface communicates with an external device. The processor is configured or programmed to perform a process including receiving monitoring target information and sensor information via the network interface, and associating the monitoring target information, the sensor information, and time information, with one another to be stored in the storage device. The monitoring target information includes key information and additional information. The key information identifies a monitoring target in the system. The additional information is additional information about the monitoring target. The sensor information is data indicating a state of the monitoring target obtained by the sensor based on the key information. The time information is information indicating a time at which the sensor information was obtained.

Further, the processor is configured or programmed to perform a process of receiving designation information from an external terminal via the network interface, and combining the monitoring target information corresponding to the obtained designation information with sensor information associated with the monitoring target information to generate combined information and output the combined information to the external terminal via the network interface. The designation information is information about the monitoring target designated by a user operating the external terminal displaying the monitoring target information.

In the management server described above, the sensor information obtained by the plurality of sensors equipped to the system is associated with the monitoring target information as information about the monitoring target and the time information about time at which the sensor information was obtained, and is stored in the storage device. Further, the processor is configured or programmed to combine the monitoring target information corresponding to the designation information designated by the user with the sensor information associated with the monitoring target information, to generate the combined information and the combined information is provided to the user via the external terminal.

Accordingly, search for sensor information about a predetermined monitoring target is facilitated, while a state of the monitoring target is able to be displayed with two different information (the sensor information and the monitoring target information).

The sensor information may include image data obtained by taking an image of a state of the monitoring target. In this case, the processor is configured or programmed to overlay the monitoring target information on the image data to generate the combined information. Accordingly, a state of the monitoring target is able to be visually displayed.

The image data may be moving image data. In this case, the processor is configured or programmed to generate the combined information, and the monitoring target information about the monitoring target is overlaid and displayed at timing when the monitoring target is displayed on the moving image data. Accordingly, it is possible to visually recognize the timing at when the predetermined monitoring target is displayed on the moving image data.

The monitoring target may be an event that occurred in the system. In this case, the moving image data may include only a portion of data obtained by taking an image of a state before and after the event that is the monitoring target. Accordingly, a state of the event that has occurred in the system is able to be visually and easily checked.

The storage device may include an external first storage device and a second storage device. The external first storage device is an external storage device that is able to access the management server via the network interface. The external first storage device stores the sensor information. In this case, the processor is configured or programmed to associate the monitoring target information, access information, and the time information, with one another to be stored in the second storage device. The access information indicates a location in the first storage device of the sensor information indicating a state of the monitoring target indicated in the corresponding monitoring target information. Further, the processor is configured or programmed to combine the sensor information obtained from the first storage device according to the access information with the monitoring target information to generate the combined information.

Accordingly, the management server is able to manage a large volume of sensor information with the external first storage device even if the internal second storage device does not have a large storage capacity.

The monitoring target may be a problem that occurred in the system. In this case, the processor may be configured or programmed to generate a problem status report as the combined information according to the monitoring target information about the problem and the sensor information associated with the monitoring target information. Accordingly, it is possible to know the details of the problem that has occurred in the system.

The processor may be configured or programmed to combine a plurality of the sensor information to generate the combined information. Accordingly, it is possible to generate the combined information in which a plurality of sensor information about the monitoring target are combined.

A management system according to another preferred embodiment of the present invention is a management system that manages a system including sensors located at a plurality of positions. This management system includes a host device that controls the system, and a management server that manages information about the system. Further, the management server includes a storage device or memory, a network interface, and a processor.

The network interface communicates with an external device.

The processor is configured or programmed to perform a process including receiving monitoring target information and sensor information via the network interface, and associating the monitoring target information, the sensor information, and time information, with one another to be stored in the storage device. The monitoring target information includes key information and additional information. The key information identifies a monitoring target in the system. The additional information is additional information about the monitoring target. The sensor information is data indicating a state of the monitoring target obtained by the sensor based on the key information. The time information is information indicating a time at which the sensor information was obtained.

Further, the processor is configured or programmed to perform a process of receiving designation information from the host device via the network interface, and combining the monitoring target information corresponding to the obtained designation information with the sensor information associated with the monitoring target information to generate combined information and output the combined information to the host device via the network interface. The designation information is information about the monitoring target designated by the user operating the external terminal displaying the monitoring target information.

Accordingly, in the management system described above, search for sensor information about a predetermined monitoring target is able to be facilitated, while a state of the monitoring target is able to be displayed with two different information (the sensor information and the monitoring target information).

A management method according to still another preferred embodiment of the present invention is a method of managing information in a management server including a storage device to manage information about a system including sensors located at a plurality of positions. The management method includes receiving monitoring target information and sensor information, the target information including key information and additional information, the key information identifying a monitoring target in the system, the additional information being additional information about the monitoring target, and the sensor information indicating a state of the monitoring target obtained by the sensor based on the key information; associating the monitoring target information, the sensor information, and time information with one another to be stored in the storage device, the time information indicating a time at which the sensor information was obtained; receiving designation information from an external terminal, the designation information being information about the monitoring target designated by the user operating the external terminal displaying the monitoring target information; and combining the monitoring target information corresponding to the designation information with sensor information associated with the monitoring target information to generate combined information and output the combined information to the external terminal.

Accordingly, in the management method described above, search for sensor information about a predetermined monitoring target is able to be facilitated, while a state of the monitoring target is able to be displayed with two different information (the sensor information and the monitoring target information).

In a management server manages information about a system equipped with a plurality of sensor, search for information is able to be facilitated, while a state of the monitoring target is able to be displayed.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4B is an enlarged view of a loading station and an unloading station and their vicinity in an automated warehouse that handles pallets.

FIG. 17 is a diagram showing one example of a display screen when a list of monitoring targets is displayed.

FIG. 25A is a diagram showing one example of the report.

FIG. 25B is a diagram showing one example of a problem recovery procedure.

DETAILED DESCRIPTION OF THE PREFERRED EMBODIMENTS

First Preferred Embodiment

Figure 1:
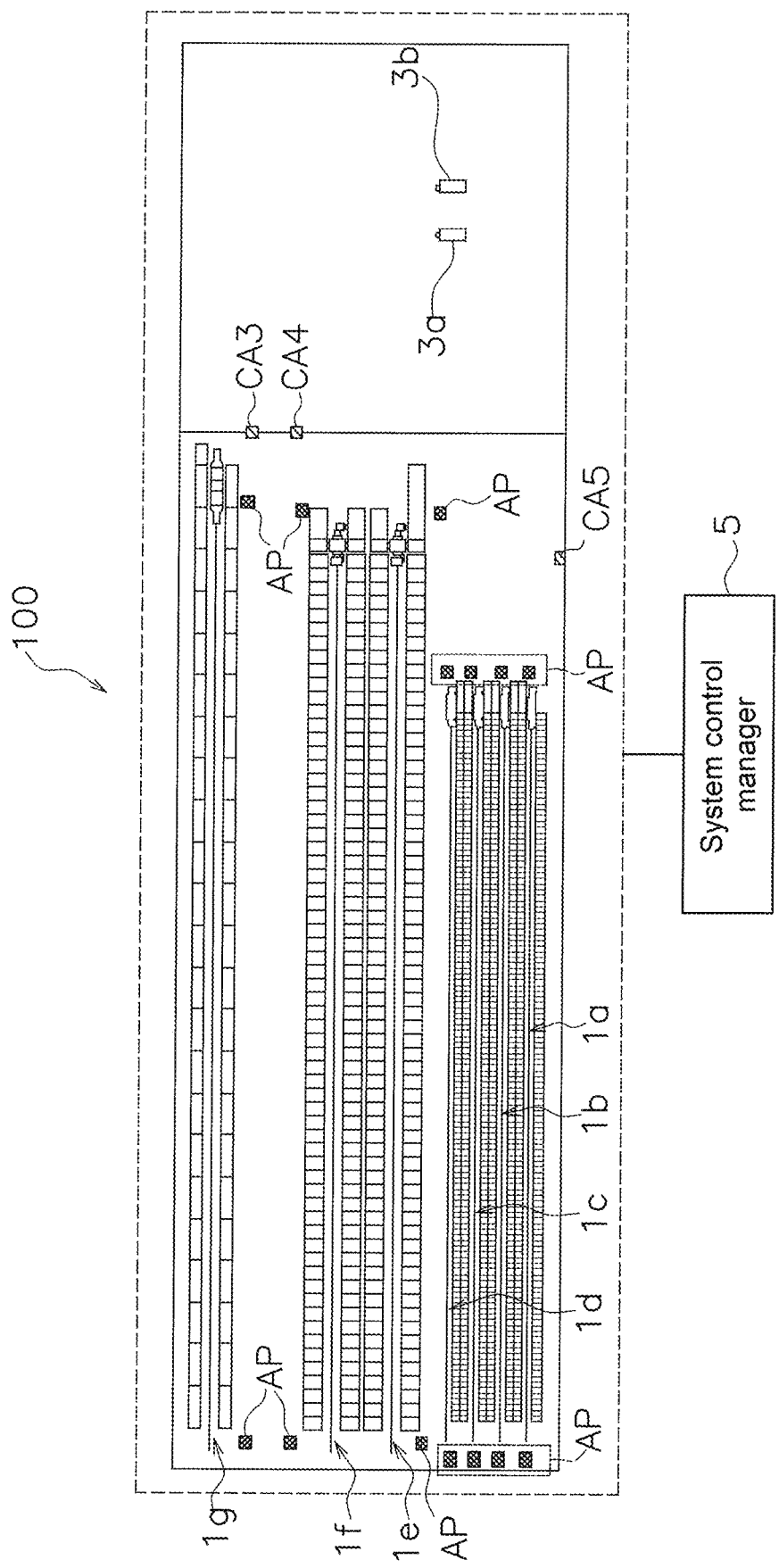
FIG. 1 is a diagram showing a structure of an automated warehouse system.

A management server according to a first preferred embodiment of the present invention is described below. The management server of the first preferred embodiment is a server that manages information about an automated warehouse system 100 (one example of a system), which performs loading and unloading, transferring, storing, and the like of parcels A in a large scale. Therefore, first, a structure of the automated warehouse system 100 in which information is managed by the management server is described with reference to FIG. 1. FIG. 1 is a diagram showing a structure of the automated warehouse system.

The automated warehouse system 100 includes a plurality of automated warehouses 1a to 1g. The plurality of automated warehouses 1a to 1g performs loading and unloading, transferring, storing, and the like of the parcels A. Among the plurality of automated warehouses 1a to 1g, the four automated warehouses 1a to 1d shown in a lower portion of FIG. 1 include the parcel A in a bucket BK and perform loading and unloading, transferring, and storing of the bucket BK. The two automated warehouses 1e and 1f shown above them include the parcel A in a pallet PL and perform loading and unloading, transferring, and storing of the pallet PL. The one automated warehouse 1g shown above them performs loading and unloading, transferring, and storing of a long parcel A (may be referred to as a "long object"). A structure of the plurality of automated warehouses 1a to 1g will be described herein.

The automated warehouse system 100 includes weight scales 3a and 3b. Within the area where the automated warehouse system 100 is installed, the weight scales 3a and 3b are located in an area different from an area where the plurality of automated warehouses 1a to 1g are provided, and the weight scales 3a and 3b are scales that weigh the parcel A.

Figure 2:
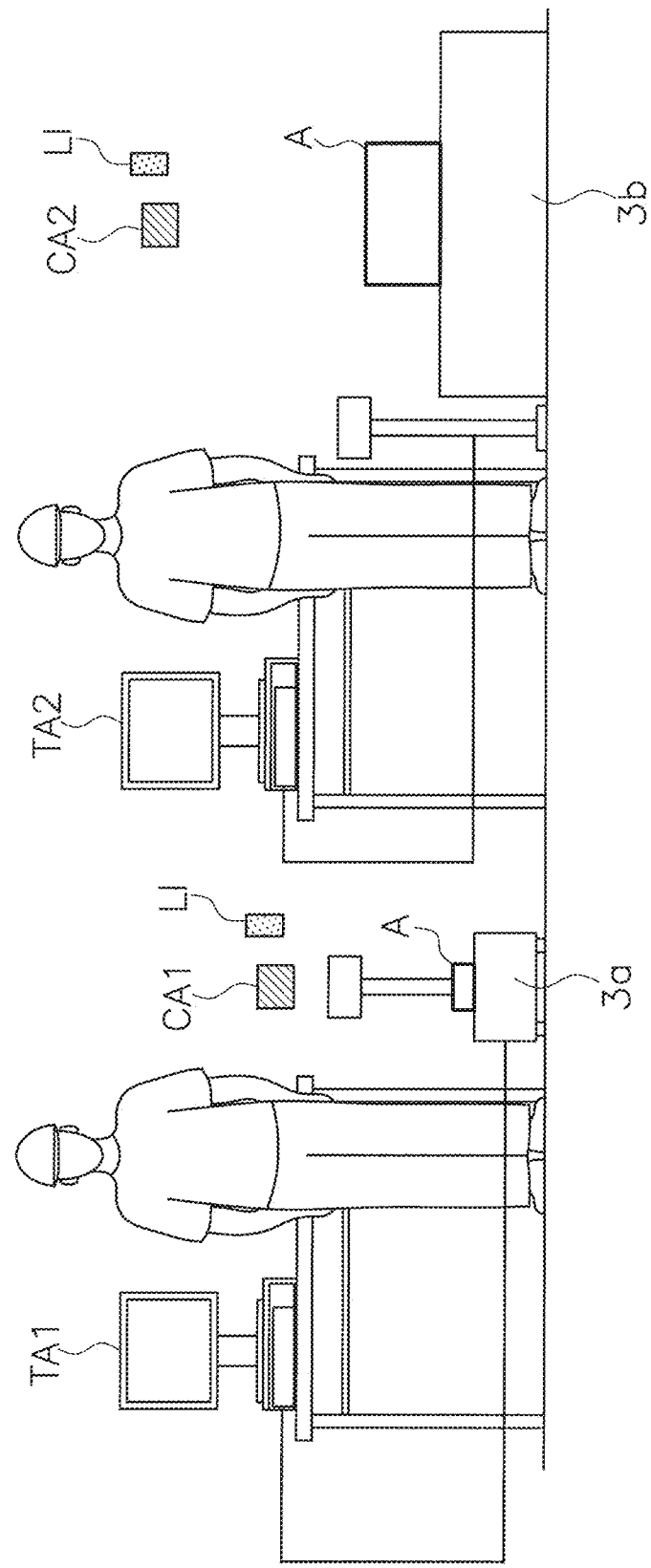
FIG. 2 is a diagram showing one example of camera positions with respect to weight scales.

As shown in FIG. 2, cameras CA1 and CA2 (one example of sensors) are respectively located at positions in the height direction facing tables of the weight scales 3a and 3b to place the parcel A. The camera CA1, CA2 is, for example, a device including a sensor (for example, a CCD sensor) that takes images. FIG. 2 is a diagram showing one example of camera positions with respect to the weight scales.

Accordingly, image data (a still image or a moving image) of the parcel A that is being weighed on the weight scale 3a, 3b is able to be obtained. Further, the weight scale 3a, 3b is provided with a light LI. The light LI illuminates the parcel A that is being weighed so that the camera CA1, CA2 is able to take images. The light LI is an LED light, for example.

A result of weighing the parcel A is sent to a host device 51 (described later) via a terminal TA1, TA2 connected to the weight scale 3a, 3b.

The automated warehouse system 100 includes a system control manager 5 (one example of a management system). The system control manager 5 is a computer system, which controls the plurality of automated warehouses 1a to 1g, and perform management of information handled in the automated warehouse system 100. A structure of the system control manager 5 will be described herein.

Other than that, the automated warehouse system 100 has access points AP located adjacent to or in a vicinity of the ends of the automated warehouses 1a to 1g. The access point AP is a relay for wireless communication, for example. A stacker crane 13 (described later) of each of the automated warehouses 1a to 1g moves along a path, and hence the camera provided to the stacker crane 13 communicates with the system control manager 5 via the access point AP.

In the first preferred embodiment, the access points AP are located at ends of the automated warehouses 1a to 1g. Accordingly, a wiring facility in the automated warehouse system 100 is able to be constructed with relatively low cost.

Further, in the automated warehouse system 100, cameras CA3 to CA5 (one example of sensors) may be located at entrances to the areas where the plurality of automated warehouses 1a to 1g are provided. The camera CA3 to CA5 are a device including a sensor, for example, a CCD sensor, that takes images. The cameras CA3 to CA5 take images of the plurality of automated warehouses 1a to 1g from the entrances, so that the stacker cranes in the automated warehouses 1a to 1g are able to be viewed overall.

Figure 3:
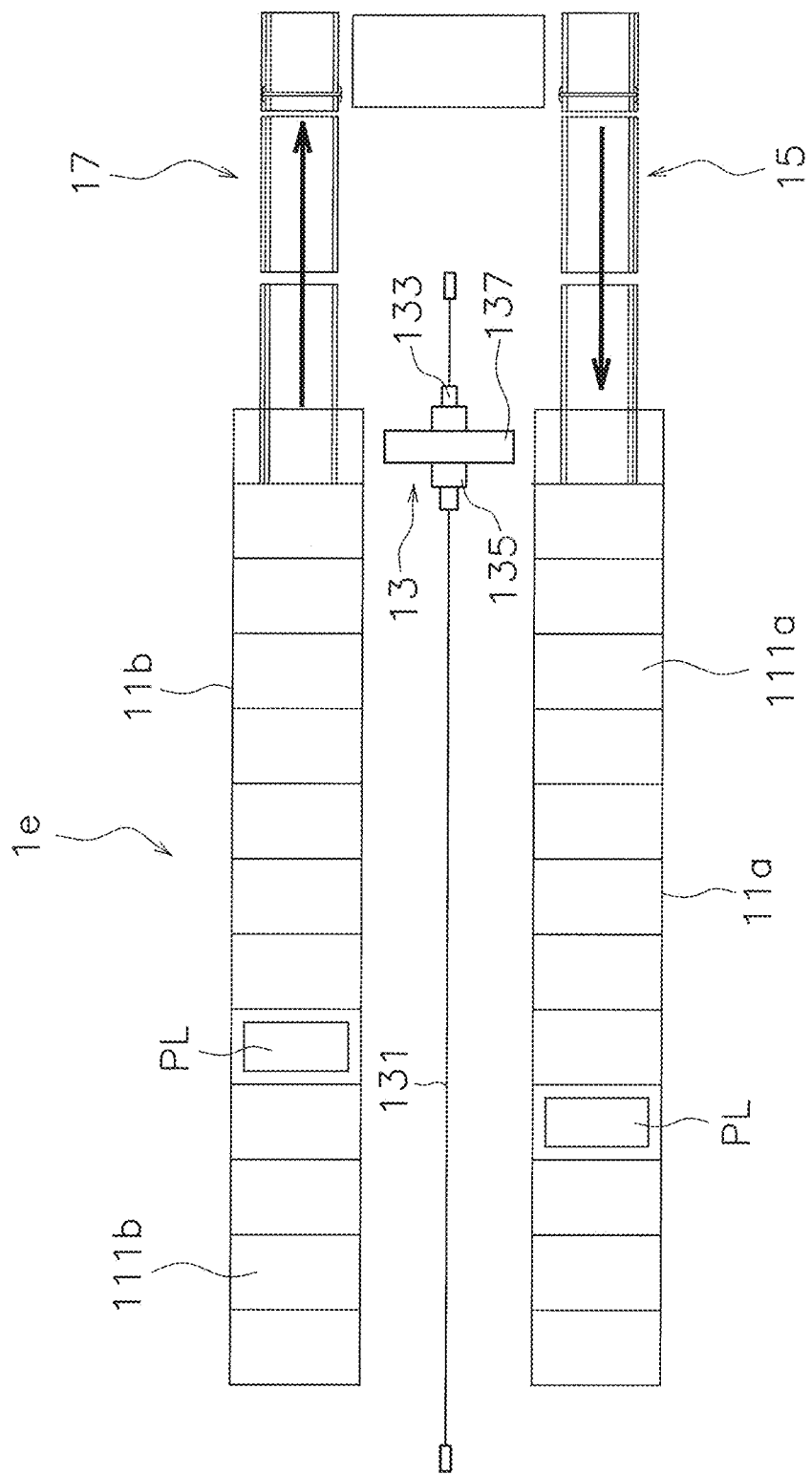
FIG. 3 is a diagram showing a structure of an automated warehouse.

A structure of the automated warehouses 1a to 1g according to the first preferred embodiment is described below with reference to FIG. 3. FIG. 3 is a diagram showing a structure of the automated warehouse. The automated warehouses 1a to 1g have the same or similar basic structure, except that a size of a rack (described later) that places the parcel A, the bucket BK, or the pallet PL handled in each automated warehouse is different depending on a size of the parcel A or the like, and that arrangement of a loading station 15 and/or a unloading station 17 is different. Therefore, in the following description, a structure of the automated warehouses 1a to 1g is described by exemplifying the automated warehouse 1e in which loading and unloading, transferring, and storing of the pallet PL including the parcel A is performed.

The automated warehouse 1e includes racks 11a and 11b. The racks 11a, 11b are facilities that store the pallet PL including the parcel A. The racks 11a, 11b are located along a traveling direction of the stacker crane 13 (the left and right direction in FIG. 3). The rack 11a is located on the lower side while the rack 11b is located on the upper side in the diagram with respect to the stacker crane 13.

The racks 11a, 11b respectively include a plurality of shelves 111a, 111b. The pallet PL is stored in the rack 11a, 11b by placing it on the shelf 111a, 111b.

The automated warehouse 1e includes the stacker crane 13. The stacker crane 13 is an apparatus that conveys the pallet PL among the plurality of shelves 111a, 111b, the loading station 15, and/or the unloading station 17. Specifically, the stacker crane 13 is able to travel along a guide rail 131 located along an extending direction of the racks 11a, 11b.

As shown in FIG. 3, the stacker crane 13 includes a traveling cart 133, an elevating table 135, and a transferring device 137. The traveling cart 133 is an apparatus that moves the elevating table 135 (a mast (not shown) equipped with the elevating table 135) along the guide rail 131. The traveling cart 133 is defined by, for example, wheels rotating on the guide rail 131, and a motor that drives the wheels to rotate.

The elevating table 135 is mounted on the mast provided to the traveling cart 133, and moves along the mast to move up and down in the height direction. For example, the elevating table 135 moves up and down along the mast by moving a chain that hangs the elevating table 135 by rotation of a sprocket connected to an output rotation shaft of the motor.

The transferring device 137 is mounted on the elevating table 135 and moves in the height direction when the elevating table 135 moves up and down. Further, when the traveling cart 133 moves along the guide rail 131, the transferring device 137 moves in the horizontal direction.

The transferring device 137 transfers the pallet PL from the stacker crane 13 to the shelf 111a, 111b of the rack 11a, 11b or the loading station 15 or the unloading station 17, or vice versa. The transferring device 137 is, for example, a slide fork that is able to reach the shelf 111a, 111b or the loading station 15 or the unloading station 17 by expanding or contracting in a direction perpendicular or substantially perpendicular to the traveling direction of the traveling cart 133.

The stacker crane 13 includes a controller (not shown) that controls the traveling cart 133, the elevating table 135, and the transferring device 137, based on an instruction about loading and unloading of the pallet PL, received from the system control manager 5.

The automated warehouse 1e includes the loading station 15. The loading station 15 is located on a side where the rack 11a is located, with respect to the stacker crane 13. The loading station 15 is a conveyor that loads the pallet PL including the parcel A. The loading station 15 includes a controller (not shown) that controls the loading station 15, based on an instruction received from the system control manager 5. Further, the loading station 15 includes a small controller (for example, a programmable logic controller (PLC)) in addition to the above controller.

The automated warehouse 1e includes the unloading station 17. The unloading station 17 is located on a side where the rack 11b is located, with respect to the stacker crane 13. The unloading station 17 is a conveyor that unloads the pallet PL including the parcel A. The unloading station 17 includes a controller (not shown) that controls the unloading station 17, based on an instruction received from the system control manager 5.

As described above, the automated warehouses 1a to 1g have different structures and features of the loading station 15 and the unloading station 17. Therefore, a structure of the loading station 15 and the unloading station 17 in each of the automated warehouses 1a to 1g are described below.

Figure 4A:
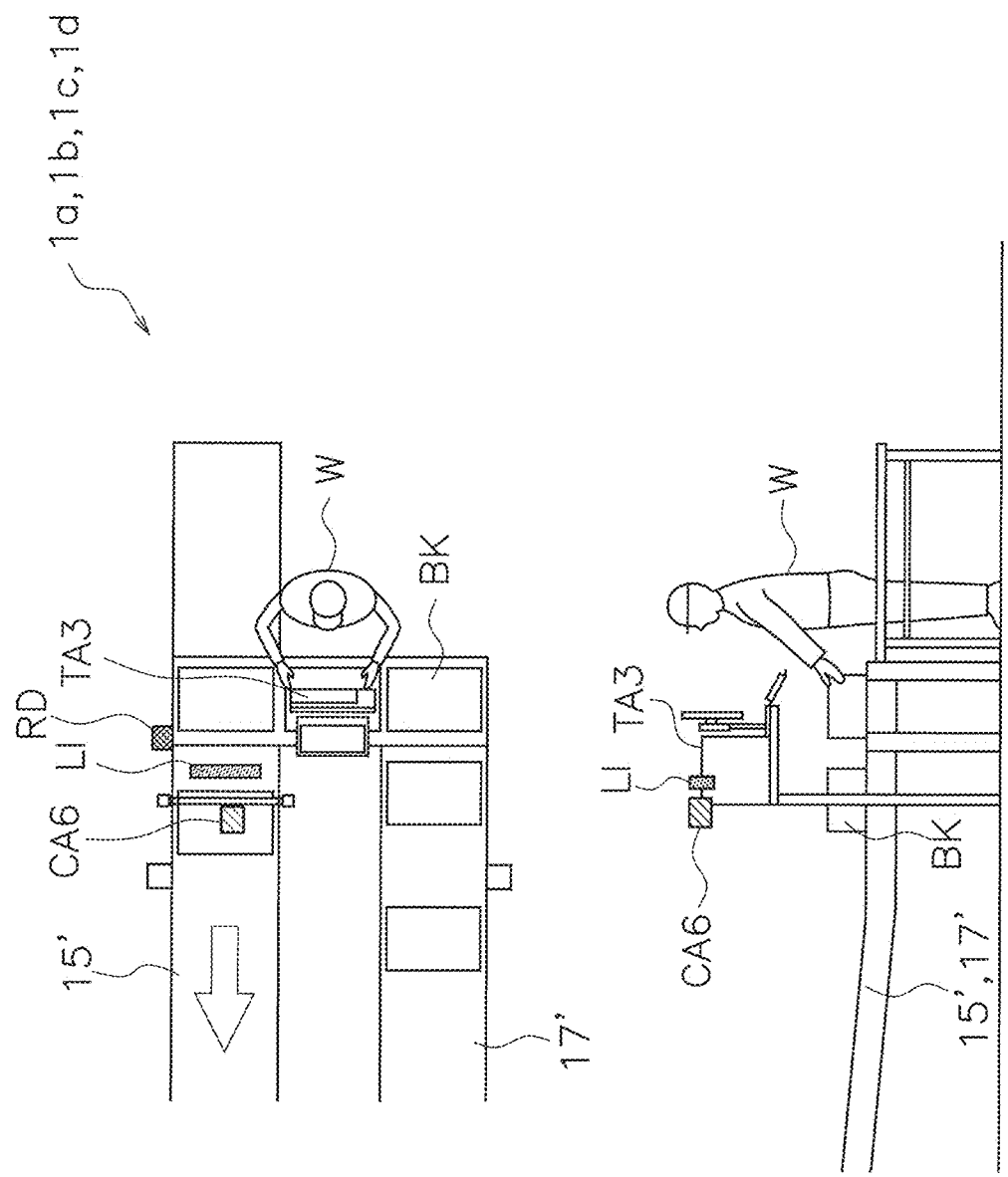
FIG. 4A is an enlarged view of a loading station and an unloading station and their vicinity in an automated warehouse that handles buckets.

In the automated warehouses 1a to 1d that handle the buckets BK, as shown in FIG. 4A, a loading station 15' is located on a side where the rack 11b is located, and a unloading station 17' is located on a side where the rack 11a is located. Further, a worker W is located between the loading station 15' and the unloading station 17'. When the bucket BK is put into storage, the worker W operates a reader device RD, for example, a barcode reader, to scan and read identification information (for example, a barcode) of the bucket BK and identification information (for example, a barcode) of the parcel A to be put in the bucket BK. In the host device 51, the read identification information of the parcel A and the identification information of the bucket BK including the parcel A are associated with each other. Accordingly, the host device 51 is able to determine which parcel A is included in which bucket BK. FIG. 4A is an enlarged view of the loading station and the unloading station and their vicinity in the automated warehouse that handles buckets.

In FIG. 4A, the diagram in the upper portion shows a top view of the loading station 15' and the unloading station 17' and their vicinity, while the diagram in the lower portion shows a side view of the loading station 15' and the unloading station 17' and their vicinity.

In the automated warehouses 1e and 1f that handle the pallets PL, as shown in FIG. 4B, similarly to the automated warehouses 1a to 1d that handle the buckets BK, a worker W is located between the loading station 15 and the unloading station 17 in each of the automated warehouses 1e and 1f. When the pallet PL is put into storage, the worker W operates the reader device RD to scan and read identification information of the pallet PL and identification information of the parcel A to be included in the pallet PL. In the host device 51, the read identification information of the parcel A and the identification information of the pallet PL including the parcel A are associated with each other. FIG. 4B is an enlarged view of the loading station and the unloading station and their vicinity in the automated warehouse that handles pallets.

In FIG. 4B, the diagram in the upper portion shows a top view of the loading station 15 and the unloading station 17 and their vicinity, while the diagram in the lower portion shows a side view of the loading station 15 and the unloading station 17 and their vicinity.

Figure 4C:
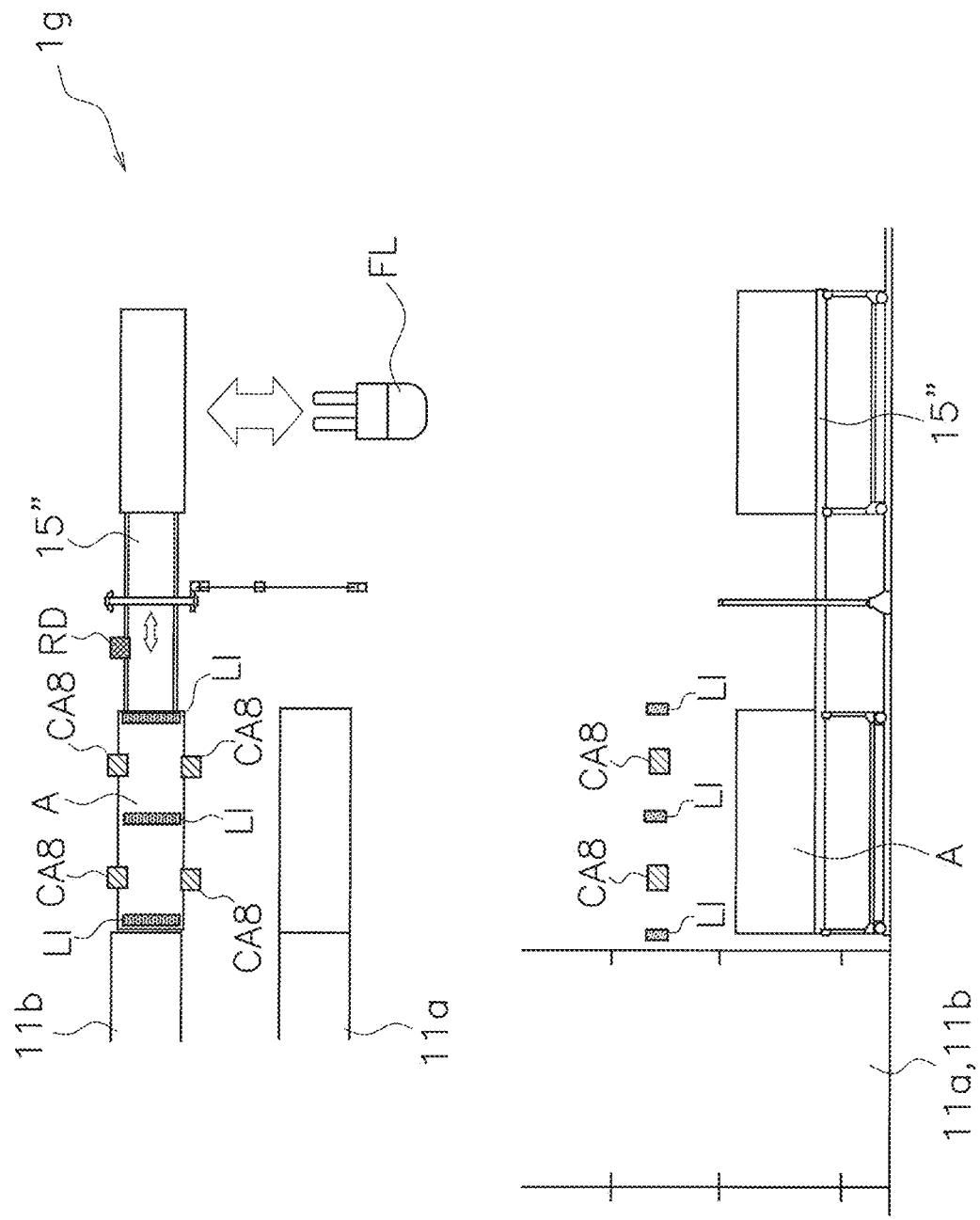
FIG. 4C is an enlarged view of a loading station and an unloading station and its vicinity in an automated warehouse that handles long parcels.

On the other hand, in the automated warehouse 1g that handles the long parcels A, as shown in FIG. 4C, the loading station and the unloading station are defined by a common conveyor 15". In the first preferred embodiment, the conveyor 15" is located on the side where the rack 11b is located. FIG. 4C is an enlarged view of the loading station and unloading station and its vicinity in the automated warehouse that handles long parcels.

In FIG. 4C, the diagram in the upper portion shows a top view of the loading station and unloading station (conveyor 15") and its vicinity, while the diagram in the lower portion of the paper shows a side view of the loading station and unloading station (conveyor 15") and its vicinity.

In the automated warehouse 1g that handles the long parcels A, the parcel A is loaded onto the conveyor having both functions of the loading station 15 and the unloading station 17 by using a forklift FL, for example, or is unloaded from the conveyor. When the long parcel A is loaded, for example, before the parcel A is carried by the forklift FL, the identification information of the parcel A is read in advance by the reader device (for example, the barcode reader) and sent to the host device. Accordingly, the host device is able to determine which parcel A is being loaded in the automated warehouse 1g.

In the first preferred embodiment, each of the automated warehouses 1a to 1g includes sensors that monitor a conveying status of the parcel A or the like in the stacker crane 13, a storing status of the parcel A or the like in the shelf 111a, 111b, states of the bucket BK, the pallet PL, and the parcel A handled in the automated warehouses 1a to 1g, and other status.

Figure 5A:
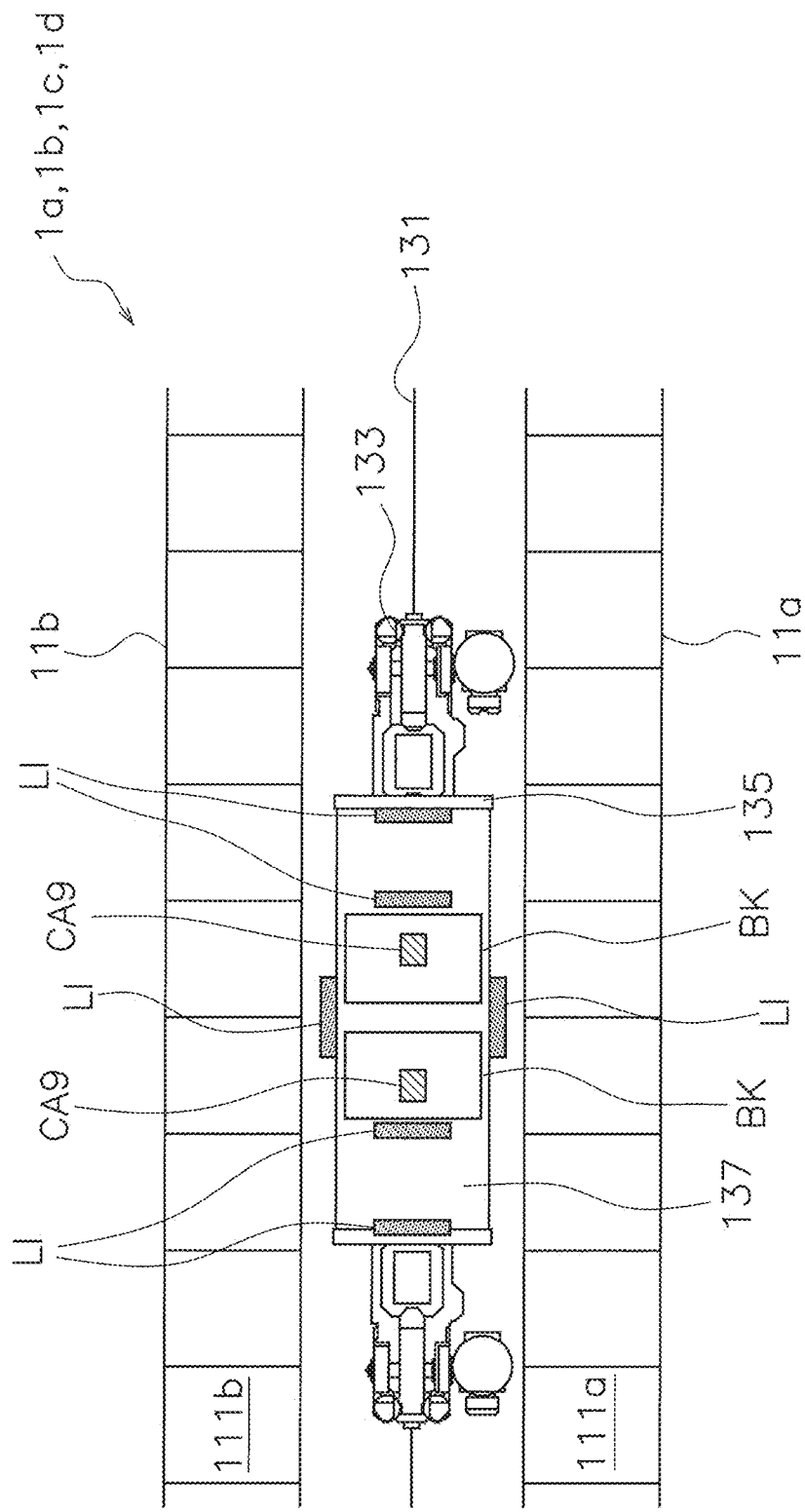
FIG. 5A is a diagram showing positions of sensors on a stacker crane of the automated warehouse that handles buckets.
Figure 5B:
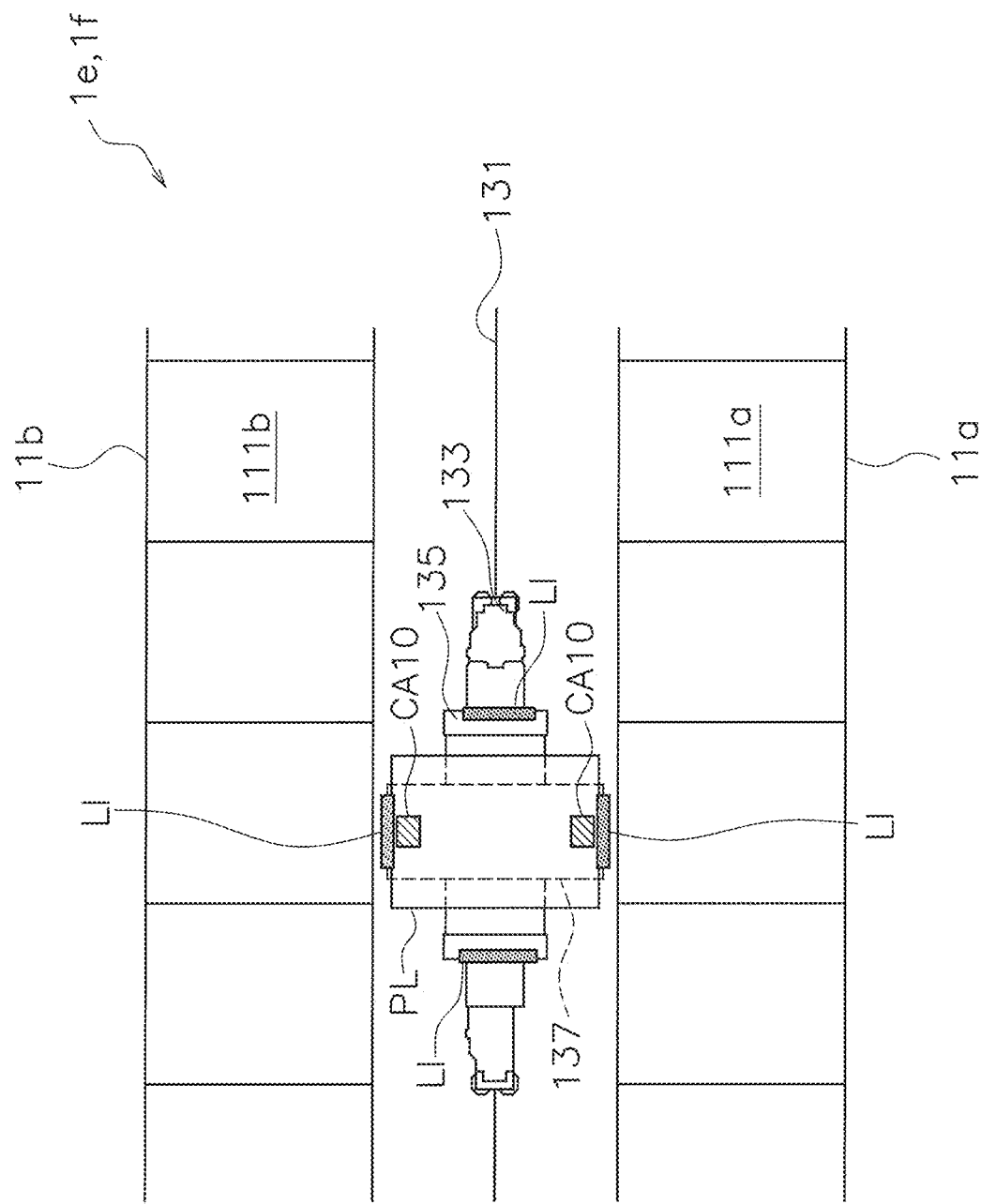
FIG. 5B is a diagram showing positions of sensors on a stacker crane of the automated warehouse that handles pallets.
Figure 5C:
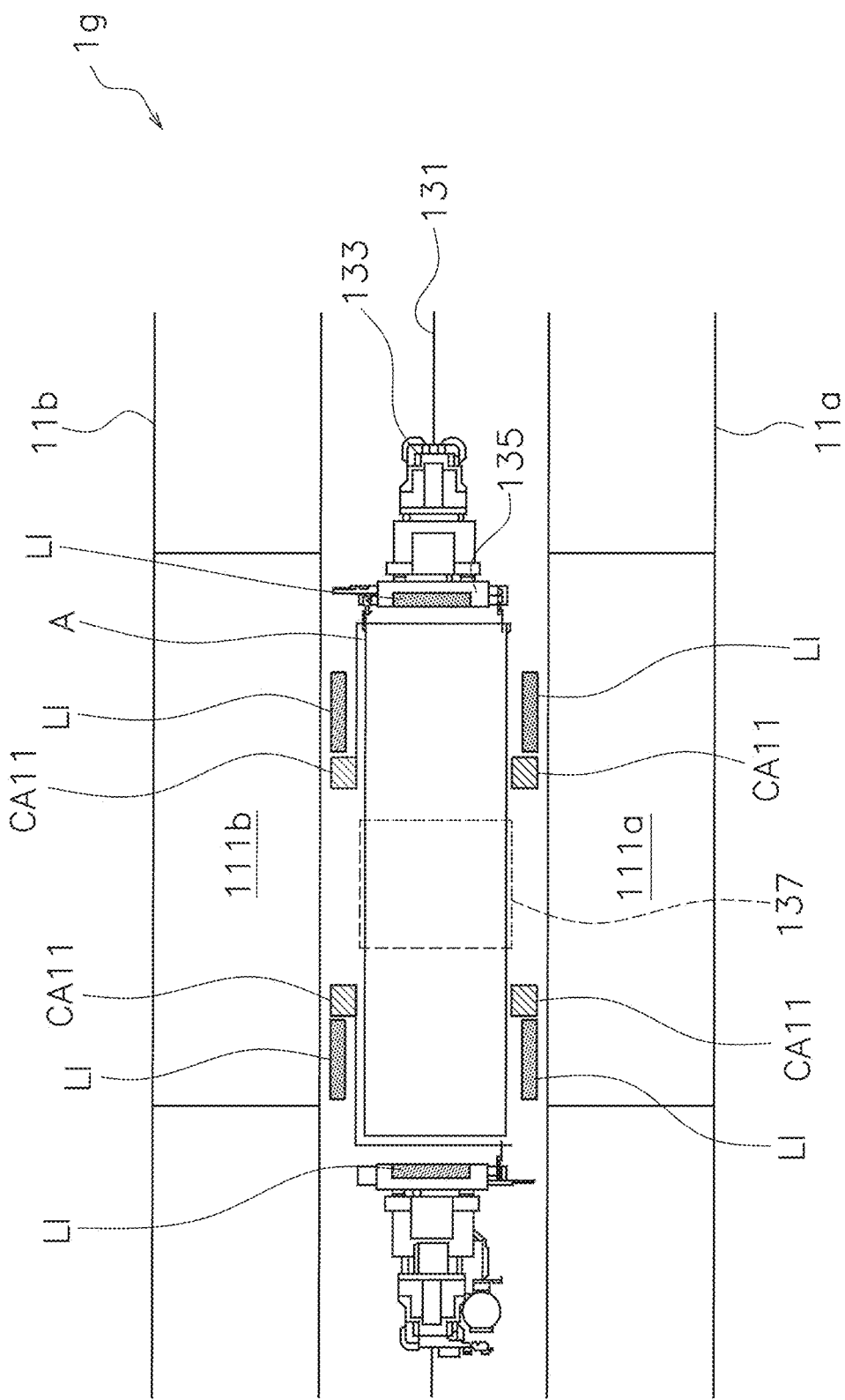
FIG. 5C is a diagram showing positions of sensors on a stacker crane of the automated warehouse that handles long parcels.

Specific positions of the sensors in the automated warehouses 1a to 1g are described below with reference to FIGS. 4A to 4C, and 5A to 5C. FIG. 5A is a diagram showing positions of the sensors on the stacker crane of the automated warehouse that handles the buckets. FIG. 5B is a diagram showing positions of the sensors on the stacker crane of the automated warehouse that handles the pallets. FIG. 5C is a diagram showing positions of the sensors on the stacker crane of the automated warehouse that handles the long parcel.

As shown in FIGS. 4A to 4C, in the loading station 15 and the unloading station 17 and their vicinity, cameras CA6 to CA8 are located adjacent to or in a vicinity of the entrance to the loading station 15. Each of the cameras CA6 to CA8 is a device that includes a sensor, for example, a CCD sensor, that takes images. Further, each of the cameras CA6 to CA8 obtains image data (moving image) constantly or substantially constantly while it is in operation, and outputting image data of a predetermined period before and after a time point when a predetermined signal is input.

Further, the light LI is located adjacent to or in a vicinity of each of the cameras CA6 to CA8. The light LI is, for example, an LED light that illuminates an imaging target of the cameras CA6 to CA8.

As shown in FIGS. 4A to 4C, positions of the cameras CA6 to CA8 are different depending on a size of the bucket BK, the pallet PL, or the parcel A handled in the automated warehouses 1a to 1g.

Specifically, as shown in FIG. 4A, in the automated warehouses 1a to 1d that handle the buckets BK, one camera CA6 is located at the center in a width direction of the loading station 15'. Further, on the loading path of the loading station 15', the reader device RD reads the identification information of the bucket BK. The identification information or the like read by the reader device RD is output to the host device 51 and the sensor, for example, the camera CA6. Accordingly, the host device 51 is able to determine which bucket BK is loaded at the loading station 15'. Further, the sensor, for example, the camera CA6, is able to determine the timing at which the data about the bucket BK is obtained. Note that the reader device RD may be located on the unloading path of the unloading station 17'.

As shown in FIG. 4B, in the automated warehouses 1e and 1f that handle the pallets PL, two cameras CA7 are provided side by side in the width direction of the loading station 15. Further, on the loading path of the loading station 15, the reader device RD reads the identification information of the pallet PL. The identification information or the like read by the reader device RD is output to the host device 51 and the sensor, for example, the camera CA7. Accordingly, the host device 51 is able to determine which pallet PL is loaded at the loading station 15. Further, the sensor, for example, the camera CA7 is able to determine the timing at which the data about the pallet PL is obtained.

In addition, as shown in FIG. 4C, in the automated warehouse 1g that handles the long parcel A, a pair of cameras CA8 are located in the width direction of the conveyor 15", and a pair of cameras CA8 are located also in a length direction of the parcel A. In other words, four cameras CA8 are located at the loading station 15 in the automated warehouse 1g.

Further, on the path of the conveyor 15", the reader device RD reads the identification information of the parcel A. The identification information or the like read by the reader device RD is output to the host device 51 and the sensor, for example, the camera CA8. Accordingly, the host device 51 is able to determine which parcel A is loaded at the conveyor 15". Further, the sensor, for example, the camera CA8, is able to determine the timing at which the data about the parcel A is obtained.

Accordingly, the cameras CA6 to CA8 are provided in accordance with a size of the bucket BK, the pallet PL, or the parcel A handled in the automated warehouses 1a to 1g, and hence the cameras CA6 to CA8 are able to obtain an overall image of the bucket BK, the pallet PL, or the parcel A as the image data.

The cameras CA6 to CA8 are able to communicate with the system control manager 5, and are able to send the obtained image data to the system control manager 5. Note that the communication between the system control manager 5 and the cameras CA6 to CA8 may be performed via a wired network, or may be performed via a wireless network by the access point AP or the like.

On the other hand, the stacker crane 13 of the automated warehouses 1a to 1g is also equipped with cameras. Accordingly, a state of the bucket BK, the pallet PL, or the parcel A carried by the stacker crane 13 (e.g. a collapse of parcel or a protrusion of the parcel A) is able to be determined. Further, when the stacker crane 13 stops at the predetermined shelf 111a, 111b, the state of the parcel A or the like at the shelf 111a, 111b is able to be monitored.

Specifically, as shown in FIG. 5A, for the elevating table 135 of the stacker crane 13 of the automated warehouses 1a to 1d that handle the buckets BK, cameras CA9 are located directly above locations of the transferring device 137 where the buckets BK are placed. In this preferred embodiment, as shown in FIG. 5A, the transferring device 137 is able to place two buckets BK (transfer onto the shelves 111a and 111b) at the same or substantially the same time, and therefore two cameras CA9 are provided corresponding to the buckets BK. The lights LI are located at ends of the buckets BK and ends of the elevating table 135 (transferring device 137).

As shown in FIG. 5B, for the elevating table 135 of the stacker crane 13 of the automated warehouses 1e and 1f that handle the pallets PL, cameras CA10 are located directly above locations to be ends of the pallet PL adjacent to or in a vicinity of the shelves 111a and 111b when the pallet PL is placed on the transferring device 137. Further, the lights LI are located at positions corresponding to the ends of the pallet PL and at ends of the elevating table 135.

As shown in FIG. 5C, for the elevating table 135 of the stacker crane 13 of the automated warehouse 1g that handles the long parcel A, cameras CA11 are respectively located adjacent to or in a vicinity of four corners of the transferring device 137. Further, the lights LI are located adjacent to or in a vicinity of the cameras CA11 and at ends of the elevating table 135.

In the first preferred embodiment, each of the cameras CA9 to CA11 is, for example, a fisheye camera including a sensor, for example, a CCD sensor, that takes images. Further, each of the cameras CA9 to CA11 obtains image data (moving image) constantly or substantially constantly while it is in operation, and outputting image data of the period from a predetermined time before timing when a predetermined signal is input until the present. Each of the cameras CA9 to CA11 sends the obtained image data to the system control manager 5 via wireless communication by the access point AP. The light LI is an LED light, for example.

As shown in FIGS. 5A to 5C, the stacker crane 13 is provided with the cameras CA9 to CA11, and hence states of the bucket BK, the pallet PL, and the parcel A that are placed on the transferring device 137 (elevating table 135) and are being conveyed are able to be monitored, and at the same or substantially the same time the storing status of the parcel A or the like in the shelf 111a, 111b is able to also be monitored by the cameras CA9 to CA11.

In the automated warehouse system 100, in addition to the cameras CA1 to CA11, other cameras may be provided if there are other imaging target whose state is intended to be monitored. The cameras including the cameras CA1 to CA11 provided to the automated warehouse system 100 are referred to as cameras CA.

Other than the cameras CA described above, each of the automated warehouses 1a to 1g is provided with other sensors SE. For example, the elevating table 135 of the stacker crane 13 of each of the automated warehouses 1a to 1g is provided with a sensor, for example, an acceleration sensor, that detects a vibration amplitude. By measuring a vibration amplitude generated by the elevating table 135, it is possible to detect a collapse of parcel or the like during conveyance of the bucket BK, the pallet PL, or the parcel A, for example.

Other than that, each of the automated warehouses 1a to 1g may be provided with a sensor, for example, a temperature and humidity sensor, that measure a state of ambient environment (for example, temperature and humidity). Accordingly, it is possible to know whether or not the parcel A or the like is stored under an appropriate environment, for example. Further, the automated warehouses 1a to 1g may be provided with a sensor (for example, a microphone) that measure a sound level generated in the automated warehouses 1a to 1g.

Figure 6:
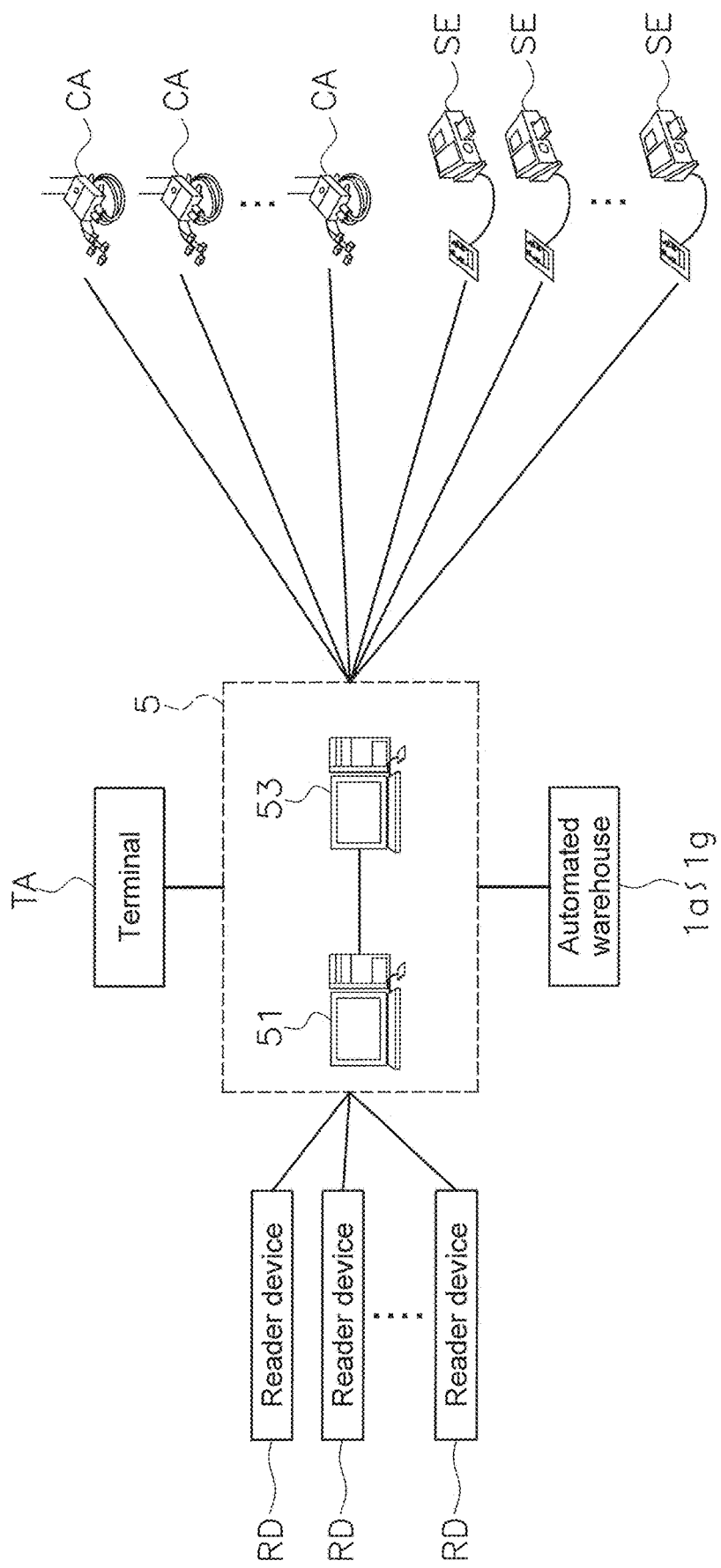
FIG. 6 is a diagram showing a structure of a system control manager.

A structure of the system control manager 5 provided to the automated warehouse system 100 of the first preferred embodiment is described below with reference to FIG. 6. FIG. 6 is a diagram showing a structure of the system control manager 5. As shown in FIG. 6, the system control manager 5 outputs instructions to control the plurality of automated warehouses 1a to 1g from the host device 51. The instruction includes information about which parcel A is to be loaded in which shelf 111a, 111b, and information about which parcel A is to be unloaded from which shelf 111a, 111b. The stacker crane 13 of each of the automated warehouses 1a to 1g is controlled based on the instruction.

Further, the system control manager 5 receives and manages information obtained by the cameras CA, the sensors SE, the reader device RD, and/or various terminals provided to the automated warehouse system 100 (for example, the terminals TA1 and TA2 connected to the weight scales 3a and 3b, and a terminals TA3 provided to the automated warehouses 1a to 1d that handle buckets BK), from the equipment or the terminal.

The system control manager 5 includes the host device 51 (one example of an external terminal). The host device 51 is a terminal that manages and controls the parcel A handled in the automated warehouse system 100 and structural elements of the automated warehouse system 100.

The system control manager 5 includes a management server 53. The management server 53 is a server that manages the information obtained by the cameras CA and the sensors SE or the like provided to the automated warehouse system 100. Further, the management server 53 combines information about the monitoring target designated by the user operating the host device 51, to generate combined information FI, and sends the combined information FI to the host device 51.

Hereinafter, structures of the host device 51 and the management server 53 included in the system control manager 5 of the first preferred embodiment are described.

Figure 7:
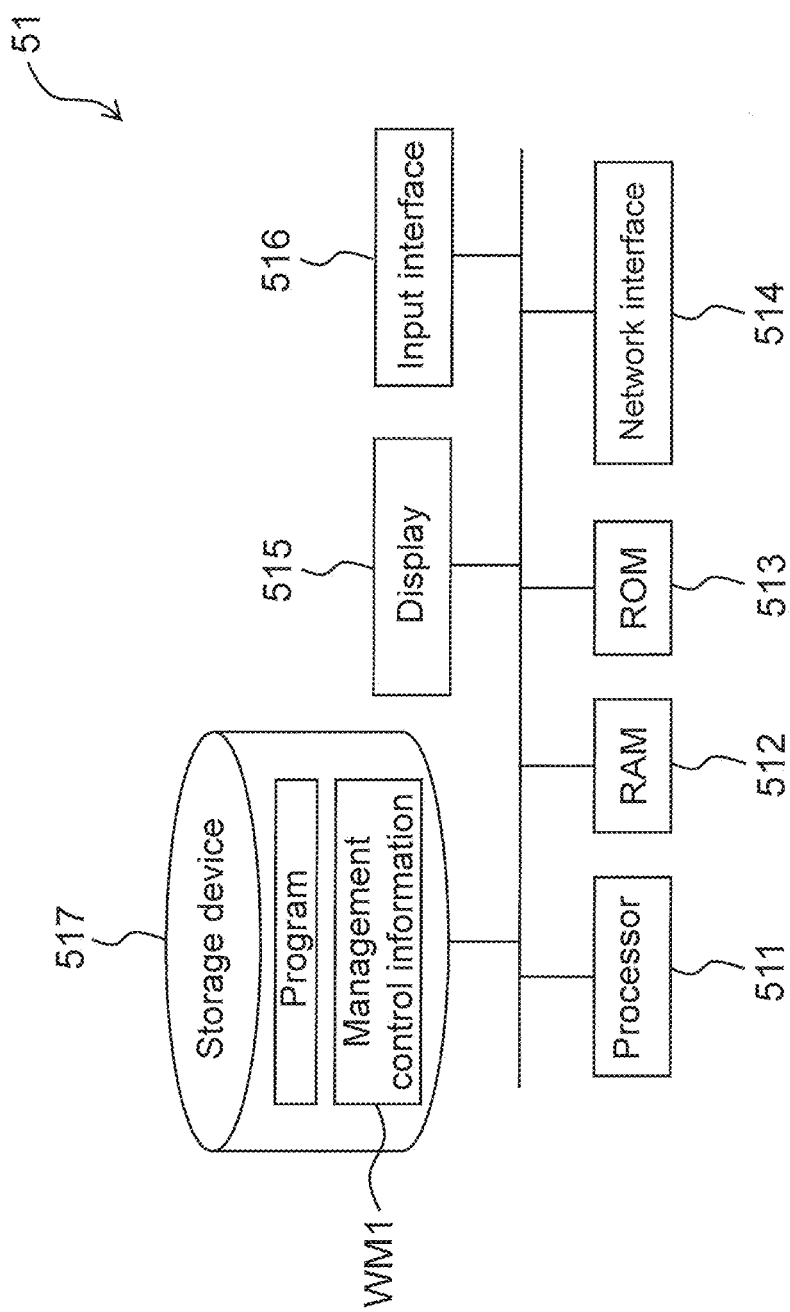
FIG. 7 is a diagram showing a structure of a host device.

As shown in FIG. 7, the host device 51 is a computer system that includes a processor 511, a RAM 512, a ROM 513, a network interface 514, a display 515, an input interface 516, and a storage device 517. FIG. 7 is a diagram showing a structure of the host device.

The processor 511 executes a program stored in the storage device 517 or the like to perform various information processing to be performed by the host device 51. For example, the processor 511 generates an instruction to control the automated warehouses 1a to 1g based on management control information WM1 (described later) stored in the storage device 517. The instruction is sent via the network interface 514 to the controllers of the automated warehouses 1a to 1g, and the controllers of the loading station 15 and the unloading station 17, and the like.

Further, the processor 511 receives a user's designation of a monitoring target whose status is intended to be displayed on the display 515. Information about the monitoring target whose status is intended to be displayed as designated by the user is referred to as "designation information". The processor 511 performs a process of receiving the combined information FI generated by the management server 53 about a state of the monitoring target designated by the designation information, and displaying the combined information FI on the display 515.

The RAM 512 stores temporary information, for example, the program stored in the storage device 517. The ROM 513 stores a program, setting, and the like to control the host device 51.

The network interface 514 performs communication with external terminals and/or equipment. The network interface 514 is, for example, an Ethernet (registered trademark) card that communicates with external terminals and/or equipment via wired communication, and/or a wireless LAN interface that communicates with external terminals and/or equipment via wireless communication.

The display 515 is a display, for example, a liquid crystal display or an organic EL display, which displays various information about the host device 51. The input interface 516 is input equipment, for example, a keyboard, a mouse, or a touch panel, which receives inputs from the user.

The storage device 517 is a storage device, for example, a hard disk or an SSD, which stores a program executed by the host device 51 and the management control information WM1.

The management control information WM1 is an aggregate of various information used to manage and control the automated warehouse system 100. Specifically, the management control information WM1 includes the identification information of the parcel A, the bucket BK, or the pallet PL handled in the automated warehouse system 100, identification information of the shelf 111a, 111b in which the parcel A, the bucket BK, or the pallet PL is to be loaded, and identification information of the shelf 111a, 111b that stores the parcel A, the bucket BK, or the pallet PL to be unloaded. Further, the management control information WM1 includes date when the parcel A is loaded, a product number, a product name, a shipping destination, and shipping date and time of the parcel A, and the number of articles.

In addition, the management control information WM1 includes information about positions of structural elements of the automated warehouse system 100, for example, the stacker cranes 13 of the automated warehouses 1a to 1g, the shelves 111a and 111b, the loading station 15, and the unloading station 17, information about mounting positions of the cameras CA and the sensors SE or the like, and information about states of these structural elements (for example, operation information of the automated warehouse system 100, and loading and unloading conveyance information). The information about mounting positions of the cameras CA and the sensors SE or the like is obtained from the management server 53 and is associated with the management control information WM1.

With the structure described above, the host device 51 is able to manage the parcel A or the like handled in the automated warehouse system 100 and the structural elements of the automated warehouse system 100, by the management control information WM1 stored in the storage device 517. Further, the host device 51 is able to generate instructions to control the structural elements of the automated warehouse system 100, based on the management control information WM1.

Figure 8:
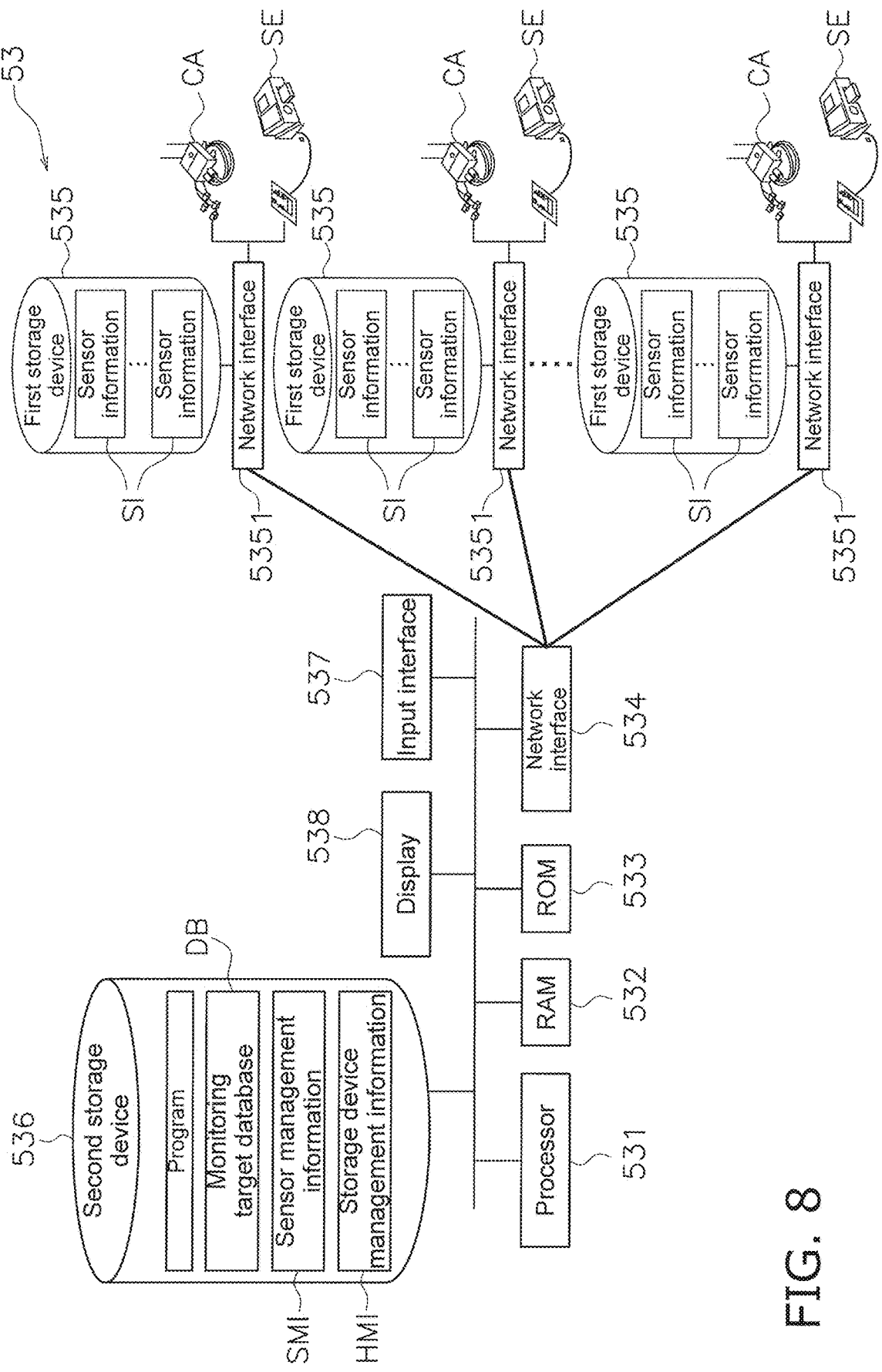
FIG. 8 is a diagram showing a structure of a management server.

A structure of the management server 53 of the first preferred embodiment is described below. As shown in FIG. 8, the management server 53 is a computer system that includes a processor 531, a RAM 532, a ROM 533, a network interface 534, and a storage device. FIG. 8 is a diagram showing a structure of the management server.

The processor 531 executes a program stored in a second storage device 536 or the like, to perform various information processing to be performed by the management server 53. Specifically, the processor 531 receives access information AI that indicates a location in a first storage device 535 of sensor information SI indicating a state of the monitoring target. After that, the information about the monitoring target (referred to as monitoring target information MI), the access information AI, and time information TI indicating a time at which the sensor information SI stored at the address indicated in the access information AI was obtained are associated with one another to be one record and stored in a monitoring target database DB.

Further, when the designation information is received from the host device 51, the processor 531 searches the monitoring target database DB for the monitoring target information MI corresponding to the designation information, i.e. the monitoring target information MI matching the information about the monitoring target designated by the designation information. After that, according to the access information AI associated with the monitoring target information MI that was found by the searching, the sensor information SI designated by the designation information is received, and the sensor information SI and the monitoring target information MI found by the searching are combined with each other to generate the combined information FI. The generated combined information FI is sent via the network interface 534 to the host device 51 that has sent the designation information.

An operation of the management server 53 when storing the above-mentioned record in the monitoring target database DB, and an operation of the management server 53 when receiving the designation information from the host device 51 will be described herein.

The RAM 532 stores temporary information, for example, the program stored in the second storage device 536. The ROM 533 stores a program, setting, and the like to control the management server 53.

The network interface 534 performs communication with external terminals and/or apparatus or the like. The network interface 534 is, for example, an Ethernet (registered trademark) card that communicates with external terminals and/or equipment via wired communication, and/or a wireless LAN interface that communicates with external terminals and/or equipment via wireless communication.

In the first preferred embodiment, the storage device of the management server 53 is defined by the first storage device 535 and the second storage device 536. The first storage device 535 downloads image data obtained by the cameras CA and measurement data obtained by the sensors SE via a network interface 5351, and stores the data as the sensor information SI. The first storage device 535 is a storage device, for example, a network attached storage (NAS), which is connected with a network. In the first preferred embodiment, a plurality of the first storage devices 535 are provided.

When the plurality of first storage devices 535 are provided, one first storage device 535 may be associated with specific cameras CA and/or sensors SE. In other words, the cameras CA and/or sensors SE whose data are able to be stored in a specific first storage device 535 may be fixed. Alternatively, each of the cameras CA and/or sensors SE may select appropriately one first storage device 535 having an appropriate free space among the plurality of the first storage devices 535, and may send the data to the selected first storage device 535.

The first storage device 535 is able to access the computer system defining the management server 53 (the system including the processor 531, the RAM 532, the ROM 533, and the network interface 534) via the network interface 5351. Accordingly, the computer system defining the management server 53 is able to obtain the sensor information SI stored in the first storage device 535 via the network interfaces 534 and 5351.

With the structure in which the sensor information SI is stored in the individual first storage device 535 that is accessible from the computer system defining the management server 53, the management server 53 is able to manage a large amount of the sensor information SI with the external first storage devices 535, even if storage capacity of the second storage device 536 inside the computer system of the management server 53 is not large.

Further, by managing the sensor information SI with the external first storage devices 535, when the amount of the sensor information SI is increased, for example, the first storage device 535 is able to be added in accordance with the increase. As a result, it is possible to avoid such a situation that the sensor information SI is not able to be stored due to lack of capacity of the storage device.

The second storage device 536 is a storage device inside the computer system of the management server 53. The second storage device 536 is a storage device, for example, a hard disk or an SSD, which stores the program executed by the management server 53, and the monitoring target database DB described above. Further, the second storage device 536 stores, in addition to the program and the database, sensor management information SMI and storage device management information HMI.

The sensor management information SMI is information to manage the cameras CA and the sensors SE provided in the automated warehouse system 100. The sensor management information SMI includes, for example, information that provides access to the cameras CA and the sensors SE, information to set the cameras CA and the sensors SE, and identification information of the first storage device 535 that stores data obtained by the cameras CA and the sensors SE.

As the information that provides access to the cameras CA and the sensors SE, there are, for example, network addresses of the cameras CA and the sensors SE, identification names (host names) thereof on the network, sequence numbers thereof, and IDs and passwords that provide access to the cameras CA and the sensors SE, and the like. As the setting of the cameras CA and the sensors SE, there are conditions to obtain data, for example.

If there occurs an addition, a deletion, an update, or the like of the camera CA or the sensor SE in the automated warehouse system 100, the management server 53 updates the sensor management information SMI, and sends the updated sensor management information SMI to the first storage device 535 and the controllers or the like of the automated warehouses 1*a* to 1*g*.

The storage device management information HMI is information that manages the first storage device 535. The storage device management information HMI includes, for example, the network address of the first storage device 535, the identification name (host name) of the first storage device 535 on the network, the sequence number, a free space amount thereof, version information, and the like.

If there occurs an addition, a deletion, an update, or the like of the first storage device 535 in the automated warehouse system 100, the management server 53 updates the storage device management information HMI, and sends the updated storage device management information HMI to the cameras CA and the sensors SE or the like.

Figure 9:
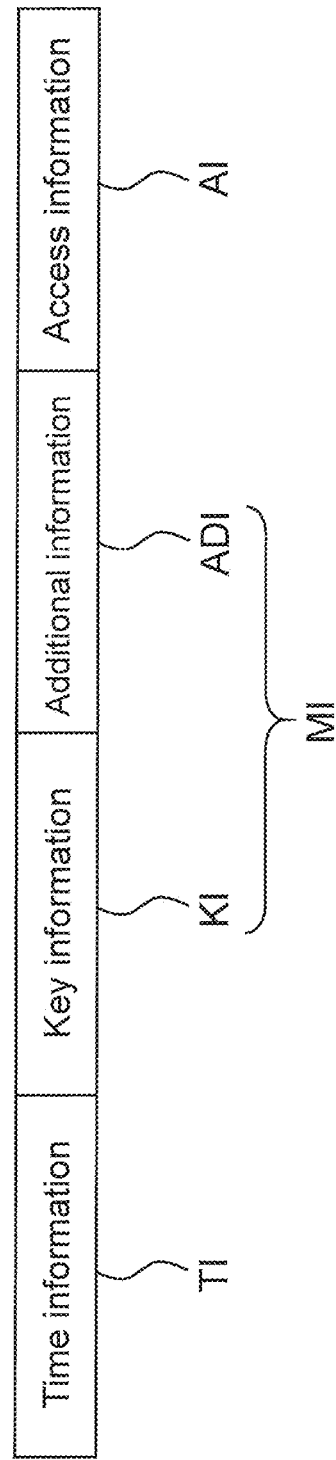
FIG. 9 is a diagram showing one example of a data structure of one record stored in a monitoring target database.

The monitoring target database DB is a database that manages the information about the monitoring target. As shown in FIG. 9, one record of the monitoring target database DB includes the monitoring target information MI, the access information AI, and the time information TI. In one record, these information are associated with one another. FIG. 9 is a diagram showing one example of a data structure of one record stored in the monitoring target database.

The monitoring target information MI is information about the monitoring target. The monitoring target information MI includes key information KI and additional information ADI. The key information KI is information that specifies the monitoring target. In the first preferred embodiment, the monitoring target managed by the management server 53 is the parcel A, an event (error) that occurs in the automated warehouse system 100, or the shelf 111*a*, 111*b*. Therefore, as the key information KI, there are, for example, the identification information of the parcel A, the bucket BK, or the pallet PL, an error type that has occurred in the automated warehouse system 100, the identification information of the shelf 111*a*, 111*b*, and the like. As described later, the key information KI becomes a trigger for the cameras CA and/or sensors SE to obtain the sensor information SI.

The additional information ADI is additional information about the monitoring target indicated in the key information KI. If the key information KI is the identification information of the parcel A, the bucket BK, or the pallet PL, the additional information ADI is, for example, a product number, a product name, a shipping destination, and shipping date and time of the parcel A included in the bucket BK or the pallet PL, the identification information of the shelf 111*a*, 111*b* on which parcel, bucket, or the pallet is stored, and the like.

If the key information KI is an error type that has occurred in the automated warehouse system 100, the additional information ADI is, for example, the identification information of the parcel A, the bucket BK, and/or the pallet PL that is being conveyed by the structural element (for example, the stacker crane 13 or the loading station 15) of the automated warehouse system 100 in which the error has occurred, and a product number, a product name, a shipping destination, and shipping date and time of the parcel A, and the like.

If the key information KI is the identification information of the shelf 111*a*, 111*b*, the additional information ADI is, for example, the identification information of the parcel A, the bucket BK, or the pallet PL stored on the shelf 111*a*, 111*b* indicated by the key information KI, and a product number, a product name, a shipping destination, and shipping date and time of the parcel A, and the like.

Other than that, the additional information ADI may include information about which camera CA or sensor SE has obtained the sensor information SI based on the associated key information KI, the position of the camera CA or the sensor SE, and the like.

The access information AI is information indicating a location in the first storage device 535 of the sensor information SI. The access information AI is, for example, information including a host name of the first storage device 535 that stores the sensor information SI, the network address and/or the sequence number thereof, a relative path and a directory name in the first storage device 535, and a file name of the sensor information SI.

Other than that, the access information AI may include additional information about the sensor information SI, e.g. a file type (moving image data, still image data, an ordinary file, or the like), and a file size of the sensor information SI.

The time information TI is information indicating a time at which the sensor information SI is obtained. The time information TI may indicate time at which the camera CA or the sensor SE has output the sensor information SI obtained by the sensor SE. Alternately, it may indicate time of a time server operated by the management server 53, at timing when the management server 53 has obtained the sensor information SI. The time of the time server operated by the management server 53 is sent to the first storage device 535, and the sensor SE and/or the camera CA, for example. Accordingly, the management server 53, the first storage device 535, and the sensor SE and/or the camera CA are able to use common time. As a result, it is possible to avoid occurrence of a time lag among these equipment.

With the structure described above, the management server 53 is able to associate the sensor information SI obtained by the plurality of cameras CA and sensors SE provided to the automated warehouse system 100 with information managed by the host device 51, to provide unified management.

In another preferred embodiment of the present invention, the management server 53 may include an input interface 537 that receives a user's input. The input interface 537 is, for example, input equipment, for example, a keyboard, a mouse, a touch panel, or the like. Accordingly, the user is able to directly manage the management server 53 by operating the input interface 537.

In another preferred embodiment of the present invention, the management server 53 may include a display 538. The display 515 is, for example, a display, for example, a liquid crystal display, an organic EL display, or the like, which displays various information about the management server 53. Accordingly, for example, the user is able to manage the management server 53 while viewing information displayed on the display 538.

Note that, even if the management server 53 does not include the input interface 537 and/or the display 538 described above, it is possible to manage the management server 53 while referring to information about the management server 53 by the terminal that is accessible via the network interface 534, for example.

An operation of the automated warehouse system 100 according to the first preferred embodiment is described below. In particular, a method for the management server 53 to manage the sensor information SI obtained in the automated warehouse system 100, and a method of showing the sensor information SI about the monitoring target designated by the external terminal, for example, the host device 51 are described.

A method for the management server 53 to manage the sensor information SI is described below. First, an outline of the method of managing sensor information SI is described.

While the automated warehouse system 100 is in operation, the cameras CA and the sensors SE obtain sensor information SI based on the key information KI that specifies the monitoring target. The obtained sensor information SI is sent to the management server 53 together with the key information KI.

The sensor information SI sent to the management server 53 is stored in the first storage device 535. The management server 53 obtains information indicating which location of which first storage device 535 the sensor information SI is stored in, as the access information AI, from the camera CA or the sensor SE that has sent the sensor information SI, for example.

In another preferred embodiment of the present invention, when the cameras CA and the sensors SE send the key information KI together with the sensor information SI, they may also send a list of storing locations (file paths) in the first storage device 535 of the sensor information SI to the management server 53.

In still another preferred embodiment of the present invention, the management server 53 may search the first storage device 535 according to the key information KI received together with the obtained sensor information SI, to obtain the access information AI indicating the storing location of the sensor information SI. Accordingly, for example, even if there occurs a replacement of the first storage device 535 and/or a decrease in the number of arrangement thereof and hence the storing destination of the sensor information SI is changed, appropriate access information AI is able to be obtained.

Further, the management server 53 obtains from the host device 51 the additional information ADI, which is additional information about the monitoring target indicated in the obtained key information KI. The management server 53 associates the key information KI, the additional information ADI, the access information AI, and the time information TI that indicates time at which the sensor information SI indicated in the access information AI is obtained, with one another to be one record, and stores the one record in the monitoring target database DB.

In the following description, a method of managing the sensor information SI when the sensor information SI has been obtained at the loading station 15, 15' or the conveyor 15", and the method of managing the sensor information SI when the sensor information SI has been obtained at the stacker crane 13, and the method of managing the sensor information SI when the sensor information SI has been obtained at the weight scale 3a or 3b, are exemplified, and the method of managing the sensor information SI in the management server 53 is further described.

Figure 10:
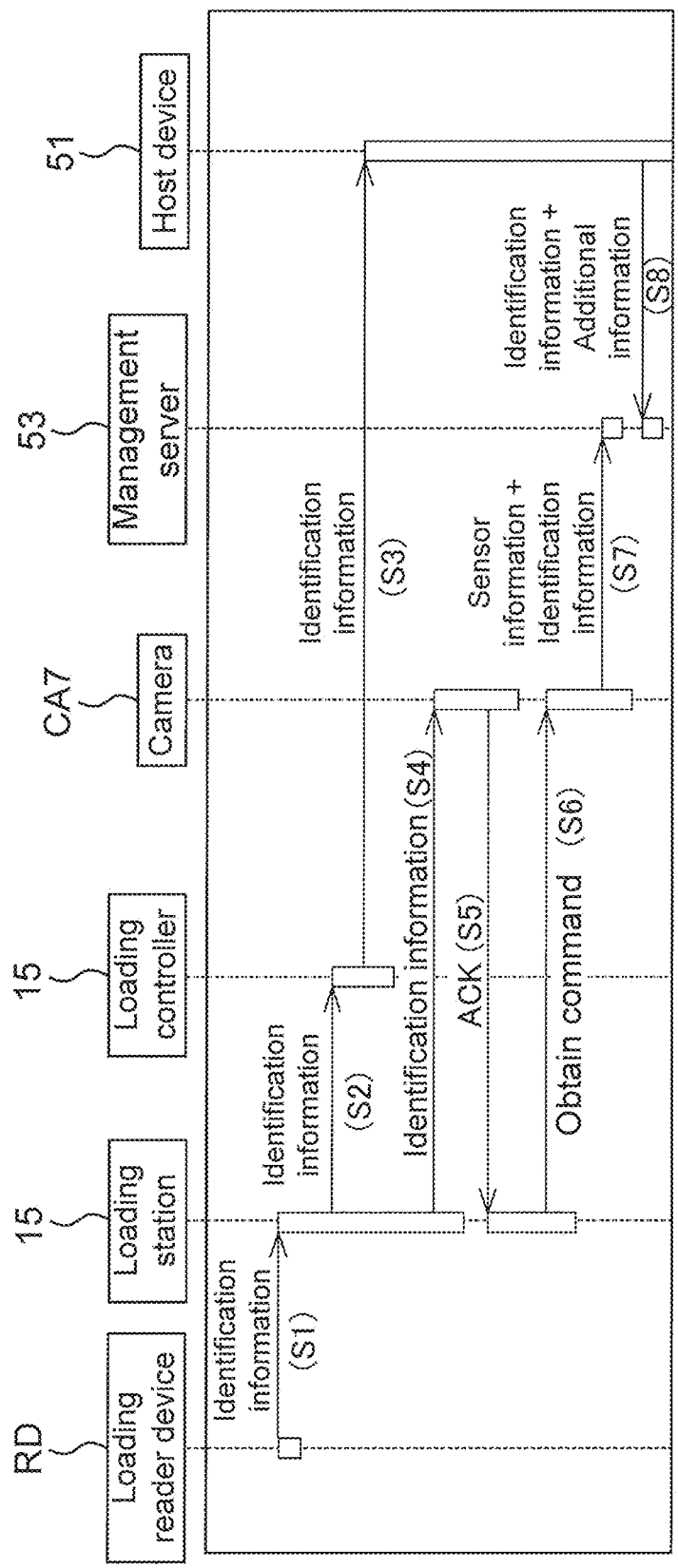
FIG. 10 is a flowchart showing one example of a method of managing sensor information in a case where a parcel or the like handled in the loading station is a monitoring target.

In the following description, the method of managing the sensor information SI obtained in the loading station is described. First, the method of managing the sensor information SI in a case where the parcel A handled by the loading station 15 is the monitoring target is described with reference to FIG. 10. FIG. 10 is a flowchart showing one example of the method of managing the sensor information in a case where the parcel or the like handled by the loading station is the monitoring target. In the following description, a case where the pallet PL (and the parcel A included in the pallet PL) is the monitoring target in the loading station 15 of the automated warehouses 1e and 1f that handles the pallets PL is exemplified.

First, the worker W reads the identification information of the parcel A to be included in the pallet PL by the reader device RD or the like. Further, the worker W reads the identification information of the pallet PL including the parcel A by the reader device RD or the like. Accordingly, the identification information of the pallet PL and the identification information of the parcel A included in the pallet PL are associated with each other. The reader device RD sends to the host device 51 the identification information of the pallet PL and the identification information of the parcel A included in the pallet PL associated with the pallet PL.

When the pallet PL including the parcel A passes the reader device RD of the loading station 15, this reader device RD reads the identification information of the passing pallet PL. The reader device RD sends the read identification information of the pallet PL as the key information KI to the small controller provided to the loading station 15 (S1).

The small controller of the loading station 15, which has received the identification information of the pallet PL as the key information KI, sends the received identification information of the pallet PL to a main controller of the loading station 15 (S2). The main controller sends the received identification information of the pallet PL to the host device 51 (S3). Accordingly, the host device 51 is able to determine that a particular pallet PL is loaded in the loading station 15 and the identification information of the pallet PL.

Further, the small controller of the loading station 15 sends to the controller of the camera CA7 the identification information of the pallet PL received in S1, as the key information KI (S4). If the camera CA7 that has received the key information KI is able to obtain the image data, the controller of the camera CA7 sends acknowledge (an ACK signal) to the small controller of the loading station 15 (S5).

If the position of the reader device RD is substantially the same as or similar to that of the camera CA7, after receiving the ACK signal, the small controller of the loading station 15 sends to the camera CA7 a command to obtain image data of the pallet PL passing the loading station 15 (obtain command) (S6).

On the other hand, if the position of the reader device RD is far from that of the camera CA7, after waiting the time for the pallet PL to reach from the position of the reader device RD to the position of the camera CA7, the small controller of the loading station 15 sends the command to obtain described above to the camera CA7.

In a case where a still image of the pallet PL is obtained as the image data, the small controller of the loading station 15 sends to the camera CA7 a shutter signal to obtain the still image as the command to obtain described above. Accordingly, the camera CA7 obtains the image data (still image) at the moment when receiving the shutter signal, to obtain the still image of the pallet PL passing the camera CA7 as the sensor information SI.

On the other hand, in a case where a moving image of the pallet PL for a predetermined period of time is obtained as the image data, the small controller of the loading station 15 sends a signal to take a moving image for a predetermined period of time (hereinafter referred to as a drive recorder signal) to the camera CA7, for example, as the command to obtain, when a predetermined time elapses after receiving the ACK signal described above. Accordingly, the camera CA7 stops recording of the moving image after receiving the drive recorder signal, and is able to obtain the sensor information SI, which is the moving image of the loading station 15 before and after the pallet PL passes the camera CA7.

After obtaining the still image or the moving image of the pallet PL passing the camera CA7 as the sensor information SI, the controller of the camera CA7 sends the obtained sensor information SI and the identification information of the pallet PL (key information KI) obtained in S4 to the management server 53 (S7).

In this case, the controller of the camera CA7 refers to the storage device management information HMI sent from the management server 53, determines the first storage device 535 to which the obtained sensor information SI is to be sent, and stores the sensor information SI in a predetermined directory of the determined first storage device 535.

After that, the controller of the camera CA7 sends the storing destination of the sensor information SI (the host name or the network address of the first storage device 535 and the relative path in the first storage device 535) to the management server 53, as the access information AI.

On the other hand, the host device 51 selects the additional information ADI to be sent to the management server 53 from the identification information of the pallet PL received in S3, and sends the selected additional information ADI to the management server 53 (S8). Specifically, the host device 51 selects the identification information of the shelf 111a, 111b on which the pallet PL is to be stored, and the identification information, a product number, a product name, a shipping destination, and shipping date and time of the parcel A included in the pallet PL from the identification information of the pallet PL, as the additional information ADI, and sends the additional information ADI to the management server 53 together with the identification information of the pallet PL.

Note that sending of the additional information ADI from the host device 51 to the management server 53 may be performed after the host device 51 receives the identification information of the pallet PL in S3. Alternatively, it may be performed when the management server 53 requests for the additional information ADI after the management server 53 received the identification information of the pallet PL and the access information AI from the controller of the camera CA7.

After receiving the identification information of the pallet PL (key information KI), the access information AI to the sensor information SI, and additional information ADI, the management server 53 associates the key information KI (the identification information of the pallet PL), the additional information ADI, the access information AI, and the time information TI, with one another to be one record, and stores the one record in the monitoring target database DB.

Accordingly, the management server 53 is able to centrally manage the sensor information SI in the case where the particular pallet PL (and the parcel A included in the pallet PL) is the monitoring target, and the additional information ADI about the particular pallet PL (and the parcel A included in the pallet PL) (for example, a product number, a product name, a shipping destination, and shipping date and time of the parcel A), and the time information TI at which the sensor information SI was obtained.

Figure 11:
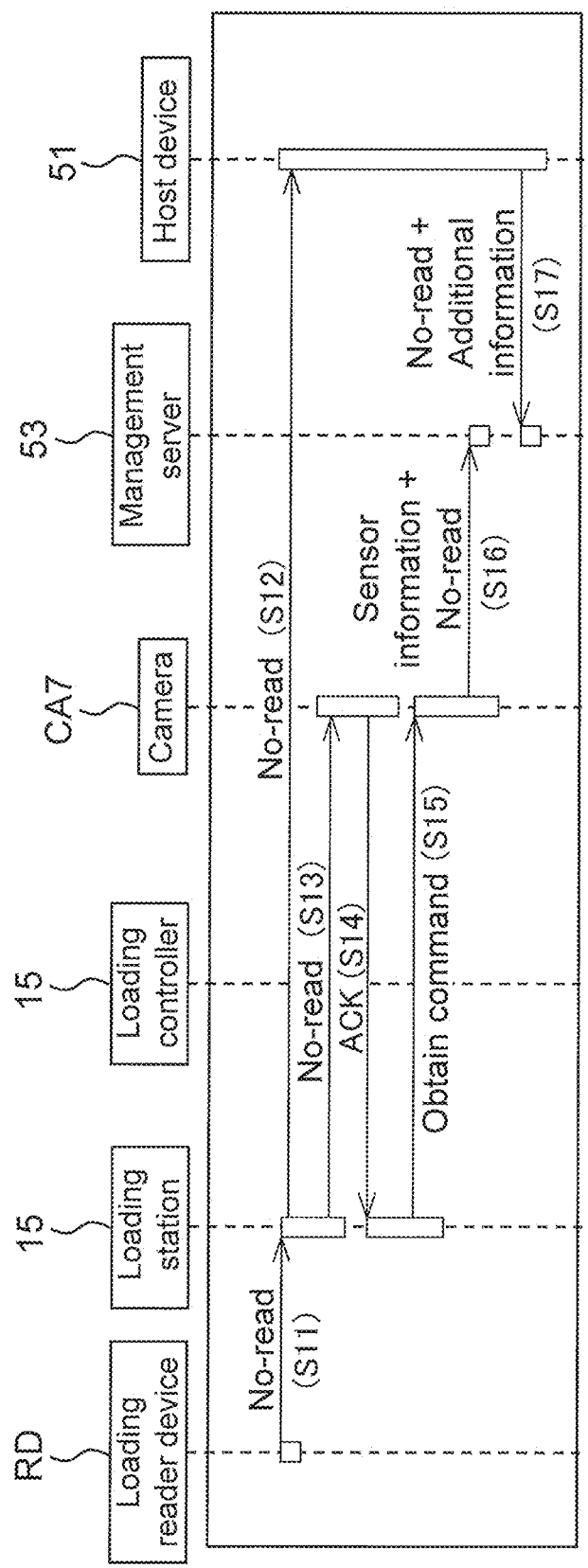
FIG. 11 is a flowchart showing one example of a method of managing sensor information in a case where an error occurred in the loading station is a monitoring target.

Next, the method of managing the sensor information SI in a case where an error occurred in the loading station 15 (one example of an event) is the monitoring target is described with reference to FIG. 11. FIG. 11 is a flowchart showing one example of the method of managing the sensor information in a case where an error occurred in the loading station is the monitoring target. In the following description, a case where the reader device RD of the loading station 15 could not appropriately read the identification information of the pallet PL passing the loading station 15 is exemplified, and the method of managing the sensor information SI is described.

If the reader device RD of the loading station 15 could not appropriately read the identification information of the pallet PL passing the loading station 15, the reader device RD sends an error (no-read error) to the small controller of the loading station 15 as the key information KI (S11).

When receiving the no-read error as the key information KI, the small controller of the loading station 15 sends the no-read error as the key information KI to the host device 51 (S12). Accordingly, the host device 51 is able to determine that an error has occurred in the loading station 15.

Further, the small controller of the loading station 15 sends the no-read error as the key information KI to the camera CA7 (S13). When receiving this key information KI, the controller of the camera CA7 sends the ACK signal to the small controller of the loading station 15 if the camera CA7 is able to obtain the image data (S14).

After receiving the ACK signal, the small controller of the loading station 15 sends the obtain command of image data of the pallet PL passing the loading station 15 (the shutter signal or the drive recorder signal) to the camera CA7 (S15).

After obtaining the still image or the moving image of the pallet PL whose identification information could not be read and passing the camera CA7 as the sensor information SI, the controller of the camera CA7 sends the obtained sensor information SI and the no-read error (key information KI) obtained in S13 as described above to the management server 53 (S16).

In this case, the controller of the camera CA7 refers to the storage device management information HMI sent from the management server 53, determines the first storage device 535 to which the obtained sensor information SI is to be sent, and stores the sensor information SI in a predetermined directory of the determined first storage device 535.

After that, the controller of the camera CA7 sends the storing destination of the sensor information SI (the host name or the network address of the first storage device 535 and the relative path in the first storage device 535) to the management server 53 as the access information AI.

On the other hand, based on content of the no-read error received in S12, for example, the host device 51 identifies the identification information of the pallet PL whose identification information could not be read and the parcel A included in the pallet PL. As described above, when the pallet PL is loaded in the automated warehouse 1e, 1f, the identification information of the pallet PL and the identification information of the parcel A to be included in the pallet PL have been read by the worker W before loading. Further, the read identification information has been sent to the host device 51.

Therefore, based on the loading station 15 in which the no-read error occurred and time at which the no-read error occurred, for example, the host device 51 is able to identify the pallet PL whose identification information could not be read by the reader device RD of the loading station 15 and the parcel A included in the pallet PL.

Note that the pallet PL whose identification information could not be read is moved from the loading station 15 to another area (dedicated area). After that, the worker W reads again the identification information of the pallet PL, and/or assigns the new identification information to the pallet PL.

After identifying the pallet PL whose identification information could not be read, the host device 51 selects the identification information of the shelf 111a, 111b on which the identified pallet PL is to be stored, the identification information, a product number, a product name, a shipping destination, and shipping date and time of the parcel A included in the identified pallet PL, as the additional information ADI, and sends them to the management server 53 together with the no-read error (key information KI) (S17).

After receiving the no-read error (key information KI), the access information AI to the sensor information SI, and the additional information ADI, the management server 53 associates the key information KI (non-read error), the additional information ADI, the access information AI, and the time information TI, with one another to be one record, and stores the one record in the monitoring target database DB.

Accordingly, the management server 53 is able to centrally manage the sensor information SI in the case where the occurrence of the no-read error is the monitoring target, the additional information ADI about the pallet PL whose identification information could not be read (and the parcel A included in the pallet PL) (for example, a product number, a product name, a shipping destination, and shipping date and time of the parcel A), the time information TI at which the sensor information SI was obtained.

Figure 12:
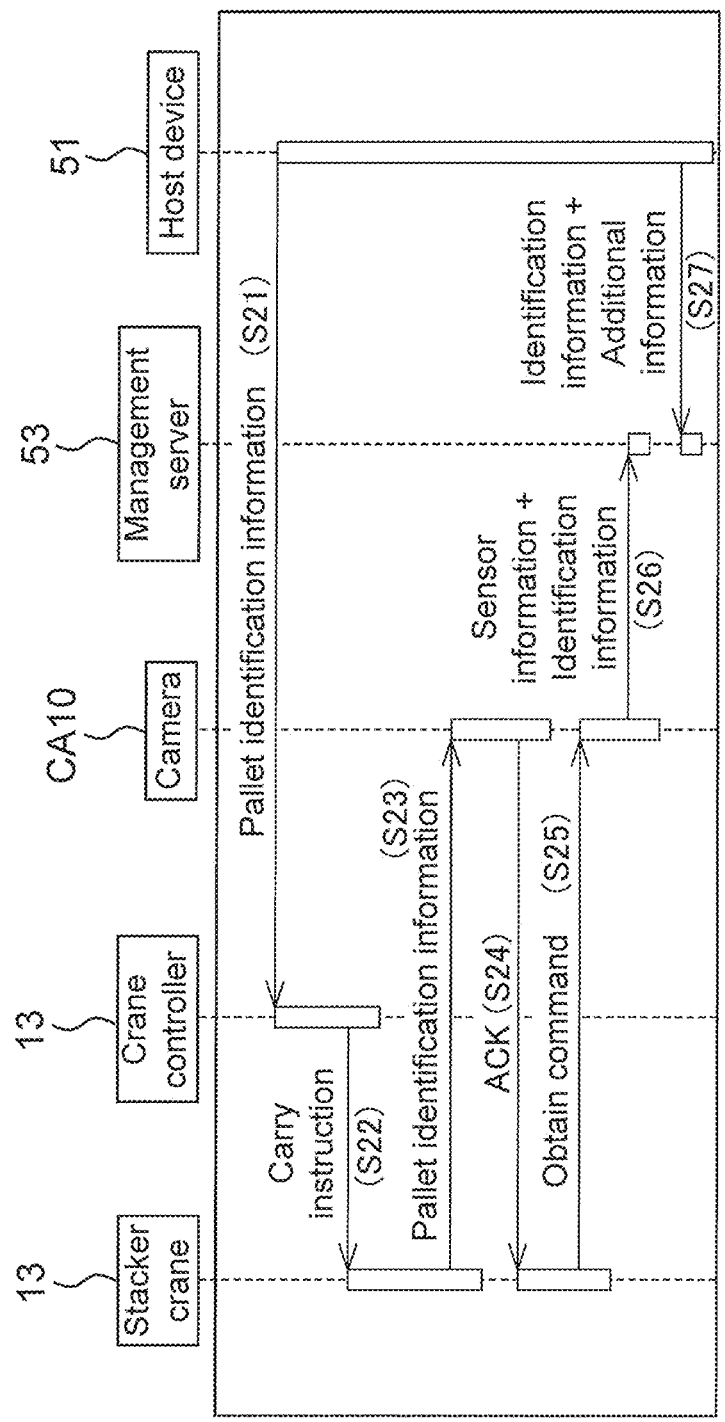
FIG. 12 is a flowchart showing one example of a method of managing sensor information in a case where a parcel or the like handled in the stacker crane is a monitoring target.

Next, the method of managing the sensor information SI obtained at the stacker crane 13 is described. First, the method of managing the sensor information SI in a case where the parcel A, the bucket BK, or the pallet PL handled by the stacker crane 13 is the monitoring target is described with reference to FIG. 12. FIG. 12 is a flowchart showing one example of the method of managing the sensor information in the case where the parcel or the like handled in the stacker crane is the monitoring target. In the following description, a case where the identification information of the pallet PL is sent as the key information KI in the automated warehouses 1e and 1f that handles the pallets PL is exemplified.

First, the host device 51 sends the identification information of the pallet PL to be carried by the stacker crane 13 to the controller of the stacker crane 13 as the key information KI (S21).

After that, when the pallet PL identified by the received identification information reaches from the loading station 15 to a position at which the pallet PL is able to be transferred to the stacker crane 13, the controller of the stacker crane 13 outputs to the stacker crane 13 a carry instruction of the pallet PL (S22). The carry instruction includes the identification information of the pallet PL to be carried by the stacker crane 13. Accordingly, the stacker crane 13 starts carrying the pallet PL.

Further, after receiving the carry instruction, the stacker crane 13 sends the identification information of the pallet PL included in the carry instruction to the camera CA10, as the key information KI (S23). After receiving this key information KI, the controller of the camera CA10 sends the ACK signal to the stacker crane 13 if the camera CA10 is able to obtain the image data (S24).

After receiving the ACK signal, the stacker crane 13 sends the obtain command of image data of a state of the pallet PL that placed on the elevating table 135 of the stacker crane 13 and is being carried, to the camera CA10 (S25).

When a still image of the pallet PL is to be obtained as the image data, the stacker crane 13 sends the shutter signal to obtain the still image to the camera CA10 as the obtain command described above. Accordingly, when the camera CA10 obtains the image data (still image) at the moment when the shutter signal is received, the still image of the pallet PL placed on the elevating table 135 is able to be obtained as the sensor information SI.

On the other hand, when a moving image of the pallet PL is to be obtained as the image data, the stacker crane 13 sends the drive recorder signal to take a moving image for a predetermined period of time, for example, to the camera CA10 as the obtain command, when a predetermined time elapses after receiving the ACK signal. Accordingly, when the camera CA10 stops recording the moving image after receiving the drive recorder signal, the moving image of the pallet PL that is placed on the elevating table 135 and is being carried is able to be obtained as the sensor information SI.

After obtaining the still image or the moving image of the pallet PL that is being carried by the stacker crane 13 as the sensor information SI, the controller of the camera CA10 sends the obtained sensor information SI, and the identification information of the pallet PL (key information KI) obtained in S23 as described above to the management server 53 (S26).

In this case, the controller of the camera CA10 refers to the storage device management information HMI sent from the management server 53, determines the first storage device 535 to which the obtained sensor information SI is to be sent, and stores the sensor information SI in a predetermined directory of the determined first storage device 535.

After that, the controller of the camera CA10 sends the storing destination of the sensor information SI (the host name or the network address of the first storage device 535 and the relative path in the first storage device 535) to the management server 53 as the access information AI.

On the other hand, the host device 51 selects the additional information ADI to be sent to the management server 53 from the identification information of the pallet PL sent in S21, and sends the selected additional information ADI to the management server 53 (S27). Specifically, from the identification information of the pallet PL, the host device 51 selects the identification information of the shelf 111a, 111b on which the pallet PL is to be stored, and the identification information, a product number, a product name, a shipping destination, and shipping date and time of the parcel A included in the pallet PL, as the additional information ADI, and sends the additional information ADI to the management server 53 together with the identification information of the pallet PL.

After receiving the identification information of the pallet PL (key information KI), the access information AI to the sensor information SI, and the additional information ADI, the management server 53 associates the key information KI (the identification information of the pallet PL), the additional information ADI, the access information AI, and the time information TI, with one another to be one record, and stores the one record in the monitoring target database DB.

Accordingly, the management server 53 is able to centrally manage the sensor information SI in the case where the pallet PL that is being carried by the stacker crane 13 (and the parcel A included in the pallet PL) is the monitoring target, the additional information ADI about the pallet PL (and the parcel A included in the pallet PL) (for example, a product number, a product name, a shipping destination, and shipping date and time of the parcel A), and the time information TI at which the sensor information SI was obtained.

In the stacker crane 13, the parcel A, the bucket BK, or the pallet PL may be moved from one shelf 111a, 111b to another shelf 111a, 111b (this is referred to as inventory). In this case, the key information KI includes the identification information of the shelf 111a, 111b of an inventory source on which the pallet PL or the like that is intended to be inventoried is stored, the identification information of the shelf 111a, 111b of an inventory destination of the pallet PL or the like, and the identification information of the shelf 111a, 111b passed on the way from the shelf 111a, 111b of the inventory source to the shelf 111a, 111b of the inventory destination. In other words, when the stacker crane 13 is in operation, the shelf 111a, 111b is able to be the monitoring target.

Figure 13:
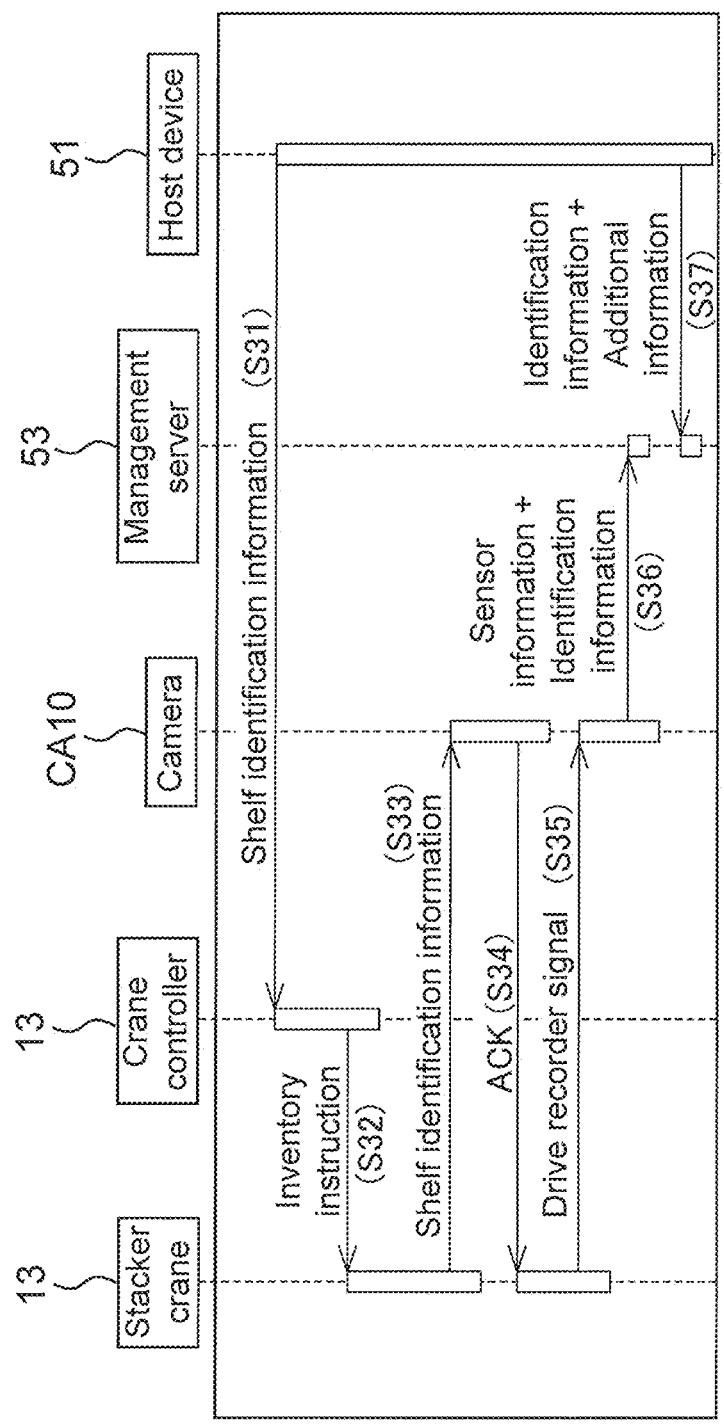
FIG. 13 is a flowchart showing one example of a method of managing sensor information in a case where a shelf is a monitoring target.

In the following description, the method of managing the sensor information SI in a case where the shelf 111a, 111b is the monitoring target is described with reference to FIG. 13. FIG. 13 is a flowchart showing one example of the method of managing the sensor information in a case where a shelf is the monitoring target. In the following description, a case where the identification information of the shelf 111a, 111b is sent as the key information KI in the automated warehouses 1e and if that handles the pallets PL is exemplified.

First, the host device 51 sends the key information KI including the identification information of the shelf 111a, 111b to the controller of the stacker crane 13 (S31).

After receiving the key information KI, the controller of the stacker crane 13 outputs an inventory instruction to the stacker crane 13 (S32). This inventory instruction includes the key information KI. Therefore, after receiving the inventory instruction, the stacker crane 13 identifies the position of the shelf 111a, 111b of the inventory source from the identification information of the shelf 111a, 111b of the inventory source included in the key information KI.

After that, the stacker crane 13, which received the inventory instruction, moves the traveling cart 133 and the elevating table 135 to the position of the shelf 111a, 111b of the inventory source identified from the key information KI.

Further, the stacker crane 13, which received the inventory instruction, sends the identification information of the shelf 111a, 111b included in the inventory instruction to camera CA10 as the key information KI (S33). After receiving this key information KI, the controller of the camera CA10 sends the ACK signal to the stacker crane 13 if the camera CA10 is able to obtain the image data (S34).

After receiving the ACK signal, and after the traveling cart 133 and the elevating table 135 reach the position of the shelf 111a, 111b of the inventory source, the stacker crane 13 sends the drive recorder signal to take a moving image of a sequential inventory process from transferring the pallet PL from the shelf 111a, 111b of the inventory source to the elevating table 135 to placing the pallet PL on the shelf 111a, 111b of the inventory destination, to the camera CA10 (S35).

Accordingly, the camera CA10 is able to obtain the sensor information SI, which is a moving image indicating a storing status of the pallet PL on the shelf 111a, 111b of the inventory source and a storing status of the pallet PL on the shelf 111a, 111b of the inventory destination, as well as a storing status of the pallet PL on the shelf 111a, 111b passed on the way from the shelf 111a, 111b of the inventory source to the shelf 111a, 111b of the inventory destination.

After obtaining the moving image of the sequential inventory process of the pallet PL as the sensor information SI, the controller of the camera CA10 sends the obtained sensor information SI, and the identification information of the shelf 111a, 111b (key information KI) obtained in S33 as described above, to the management server 53 (S36).

In this case, the controller of the camera CA10 refers to the storage device management information HMI sent from the management server 53, determines the first storage device 535 to which the obtained sensor information SI is to be sent, and stores the sensor information SI in a predetermined directory of the determined first storage device 535.

After that, the controller of the camera CA10 sends the storing destination of the sensor information SI (the host name or the network address of the first storage device 535 and the relative path in the first storage device 535) to the management server 53 as the access information AI.

On the other hand, the host device 51 selects the additional information ADI to be sent to the management server 53 from the identification information of the shelf 111a, 111b sent in S31, and sends the selected additional information ADI to the management server 53 (S37). Specifically, the host device 51 sends the identification information of the pallet PL of the inventory target, the identification information, a product number, a product name, a shipping destination, and shipping date and time of the parcel A included in the pallet PL, as the additional information ADI. In addition to this, the additional information ADI includes the identification information of the pallet PL stored on the shelves 111a and 111b passed on the way from the shelf 111a, 111b of the inventory source to the shelf 111a, 111b of the inventory destination, the identification information, a product number, a product name, a shipping destination, and shipping date and time of the parcel A included in the pallet PL.

After receiving the identification information of the pallet PL (key information KI), the access information AI to the sensor information SI, and the additional information ADI, the management server 53 associates the key information KI (the identification information of the pallet PL), the additional information ADI, the access information AI, and the time information TI, with one another to be one record, and stores the one record in the monitoring target database DB.

Accordingly, the management server 53 is able to centrally manage the sensor information SI in the case where the pallet PL of the inventory target and the shelves 111a and 111b passed during the inventory process are monitoring targets, the additional information ADI about the pallet PL and the shelves 111a and 111b, and the time information TI at which the sensor information SI was obtained.

Figure 14:
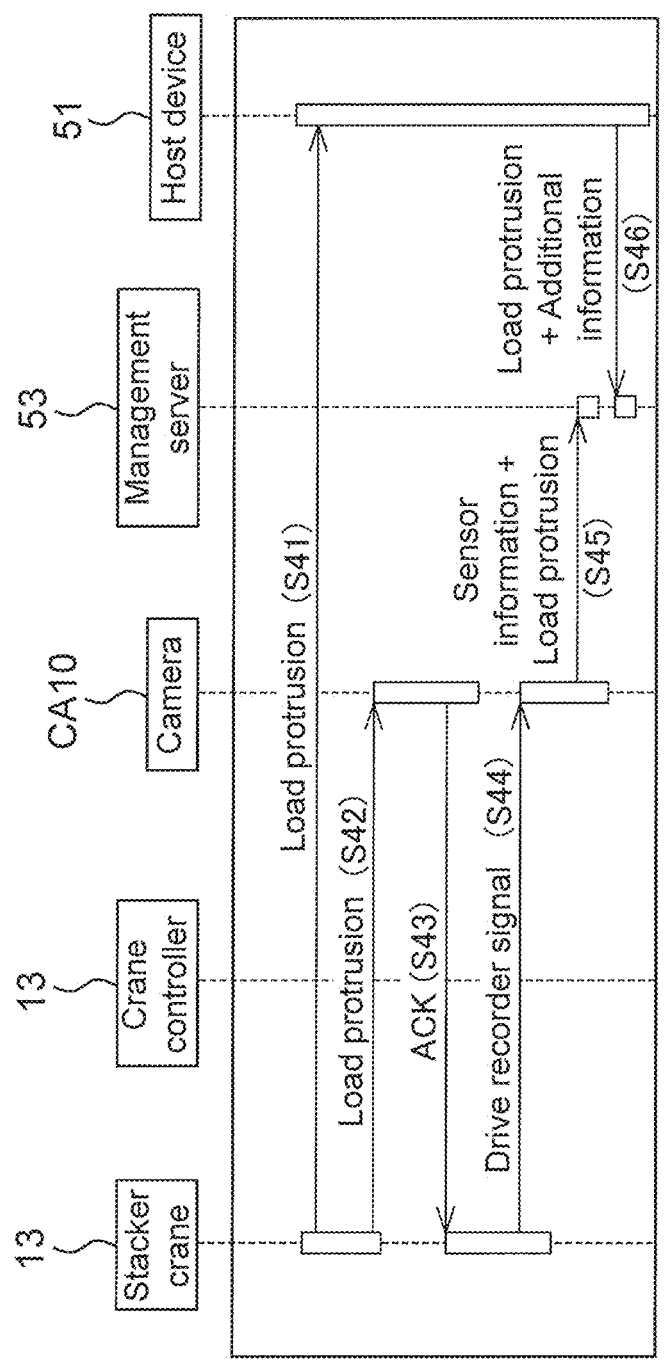
FIG. 14 is a flowchart showing one example of a method of managing sensor information in a case where an error that occurred in the stacker crane is a monitoring target.

Next, the method of managing the sensor information SI in case where an error (one example of an event) occurred in the stacker crane 13 is the monitoring target is described with reference to FIG. 14. FIG. 14 is a flowchart showing one example of the method of managing the sensor information in a case where an error occurred in the stacker crane is the monitoring target. In the following description, a case where the pallet PL protrudes from the elevating table 135 in the stacker crane 13 is exemplified, and the method of managing the sensor information SI is described.

Note that in the stacker crane 13, an error occurs not only in the case where the pallet PL or the like protrudes from the elevating table 135 but also in a case where a collapse of the parcel, which is a case where the parcel A included in the pallet PL collapses, occurs. Also in a case where the collapse of the parcel occurs in the stacker crane 13, similarly to the following description, the collapse of the parcel is regarded as the monitoring target, and the sensor information SI indicating the collapse of the parcel is able to be obtained and managed.

For example, when the sensor SE of the stacker crane 13 detects a state where the pallet PL protrudes from the elevating table 135, the stacker crane 13 sends a load protrusion error and the identification information of the carried pallet and parcel to the host device 51 as the key information KI (S41). Further, the stacker crane 13 sends the load protrusion error to the camera CA10 as the key information KI (S42). After receiving this key information KI, the controller of the camera CA10 sends the ACK signal to the stacker crane 13 if the camera CA10 is able to obtain the image data (S43).

After receiving the ACK signal, the stacker crane 13 sends the drive recorder signal to take a moving image for a period before the reception of the ACK signal until now, to the camera CA10 (S44). Accordingly, the camera CA10 is able to obtain the moving image of the pallet PL before the sensor SE or the like detects the load protrusion, i.e. an image data portion of a load protrusion state before and after the event of the load protrusion error occurred, as the sensor information SI.

After obtaining the moving image of the load protrusion state as the sensor information SI, the controller of the camera CA7 sends the obtained sensor information SI, and the load protrusion error and the identification information (key information KI) of the carried pallet and parcel obtained in S42 as described above (S45), to the management server 53. In this case, the sensor SE that has detected the load protrusion may send a measurement result by the sensor SE when the load protrusion is detected, to the management server 53 as the sensor information SI.

In this case, the controller of the camera CA10 (and the sensor SE) refers to the storage device management information HMI sent from the management server 53, determines the first storage device 535 to which the obtained sensor information SI is to be sent, and stores the sensor information SI in a predetermined directory of the determined first storage device 535.

After that, the controller of the camera CA10 (and the sensor SE) sends the access information AI, which is the storing destination of the sensor information SI (the host name or the network address of the first storage device 535 and the relative path in the first storage device 535), to the management server 53.

On the other hand, the host device 51 identifies the identification information of the pallet PL of the load protrusion and the parcel A included in the pallet PL, based on content of the load protrusion error received in S41, for example. As described above, when the pallet PL is loaded in the automated warehouses 1e and 1f, the identification information of the pallet PL and the identification information of the parcel A included the pallet PL have been read by the worker W before loading. Further, the read identification information has been sent to the host device 51.

Therefore, the host device 51 is able to identify the pallet PL of the load protrusion and the parcel A included in the pallet PL, based on the loading station 15 at which the load protrusion error has occurred and time at which the load protrusion error has occurred, for example.

Further, the host device 51 generates the carry instruction of the pallet PL or the like, and determines which pallet PL is being carried at which timing. Therefore, in another preferred embodiment of the present invention, the host device 51 may identify the pallet PL of the load protrusion and the parcel A included in the pallet PL based on time at which the load protrusion error has occurred and the carry instruction.

After identifying the pallet PL of the load protrusion, the host device 51 selects the identification information of the shelf 111a, 111b on which the identified pallet PL is to be stored, and the identification information, a product number, a product name, a shipping destination, and shipping date and time of the parcel A included in the identified pallet PL, as the additional information ADI, and sends the additional information ADI to the management server 53 together with the load protrusion error (key information KI) (S46).

After receiving the load protrusion error (key information KI), the access information AI to the sensor information SI, and the additional information ADI, the management server 53 associates the key information KI (the load protrusion error), the additional information ADI, the access information AI, and the time information TI described above, with one another to be one record, and stores the one record in the monitoring target database DB.

Accordingly, the management server 53 is able to centrally manage the sensor information SI in the case where the load protrusion error is the monitoring target, the additional information ADI about the pallet PL of the load protrusion (and the parcel A included in the pallet PL) (for example, a product number, a product name, a shipping destination, and shipping date and time of the parcel A), and the time information TI at which the sensor information SI was obtained.

Figure 15:
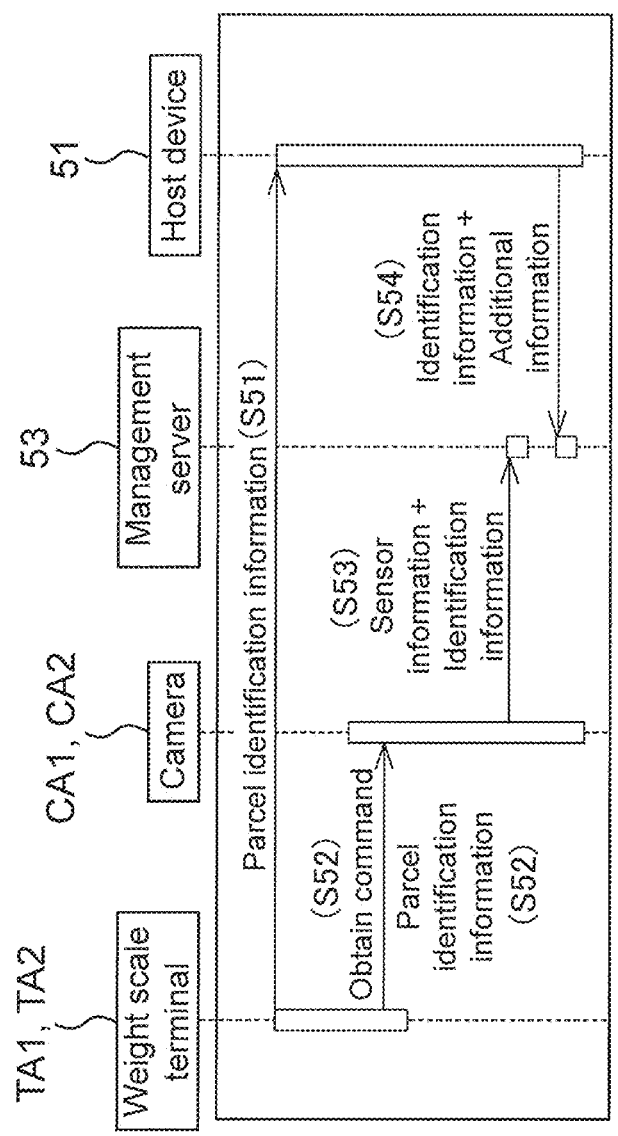
FIG. 15 is a flowchart showing one example of a method of managing sensor information obtained by the weight scale.

In the following description, the method of managing the sensor information SI obtained by the weight scale $3a$, $3b$ is described with reference to FIG. 15. FIG. 15 is a flowchart showing one example of the method of managing the sensor information obtained by the weight scale.

For example, the worker W inputs the identification information of the parcel A that is intended to be weighed by the weight scale $3a$, $3b$, to the terminal TA1, TA2. The terminal TA1, TA2 then sends the input identification information of the parcel A to the host device 51 as the key information KI (S51).

After inputting the identification information of the parcel A that is intended to be weighed to the terminal TA1, TA2 as the key information KI, the worker W places the parcel A that is intended to be weighed on the weight scale $3a$, $3b$ to weigh the parcel A. Further, the terminal TA1, TA2 sends the obtain command of image data of the parcel A that is being weighed, and the identification information of the parcel A that is being weighed, to the camera CA1, CA2 (S52).

After receiving the obtain command described above, the camera CA1, CA2 obtains image data (a moving image or a still image) of the parcel A that is being weighed. After obtaining the image data of the parcel A that is being weighed, the image data and a result of weighing the parcel A is sent to the management server 53 as the sensor information SI together with the identification information of the parcel A (S53). The sensor information SI is stored in the first storage device 53S.

On the other hand, the host device 51 selects the additional information ADI to be sent to the management server 53 from the identification information of the parcel A received in S51, and sends the selected additional information ADI to the management server 53 (S54). Specifically, the host device 51 selects a product number, a product name, a shipping destination, and shipping date and time of the parcel A indicated in the identification information as the additional information ADI, and sends the additional information ADI to the management server 53 together with the identification information of the parcel A.

After receiving the identification information of the parcel A (key information KI), the access information AI to the sensor information SI, and the additional information ADI, the management server 53 associates the key information KI (the identification information of the parcel A), the additional information ADI, the access information AI, and the time information TI described above, with one another to be one record, and stores the one record in the monitoring target database DB.

Accordingly, the management server 53 is able to centrally manage the sensor information SI (a result of weighing, an image of the parcel A that is being weighed) in the case where the parcel A to be weighed is the monitoring target, the additional information ADI about the parcel A (for example, a product number, a product name, a shipping destination, and shipping date and time of the parcel A), and the time information TI at which the sensor information SI was obtained.

In the following description, regarding the sensor information SI about the monitoring target designated by the external terminal, for example, the host device 51, a method of showing the sensor information SI managed by the management server 53 on the external terminal is described. First, an outline of the method of showing the sensor information SI is described.

In order to view the sensor information SI managed by the management server 53, by the external terminal, for example, the host device 51, an application program to view the sensor information SI is activated on the external terminal. The software may be a web browser or may be dedicated application software.

When the application program or the like is activated, the program downloads a list of the sensor information SI managed by the management server 53 from the monitoring target database DB. After that, a list of the monitoring target information MI associated with the sensor information SI and the time information TI is displayed on the display of the external terminal.

The list of the sensor information SI displayed on the external terminal may be, for example, of the list stored in the monitoring target database DB, a list of targets narrowed according to keywords by the user of the external terminal.

The user of the external terminal selects a predetermined monitoring target from the list displayed on the external terminal. The information about the monitoring target selected by the user is sent as the designation information to the management server 53.

After receiving the designation information from the external terminal, the management server 53 searches the monitoring target database DB for the monitoring target information MI matching the information about the monitoring target indicated in the received designation information. After that, according to the access information AI associated with the found monitoring target information MI, the management server 53 obtains the sensor information SI indicating the state of the monitoring target designated by the designation information, and combines the sensor information SI with the monitoring target information MI found by the search to generate the combined information FI. The management server 53 sends the generated combined information FI to the external terminal that has sent the designation information.

In the first preferred embodiment, the sensor information SI is provided as the sensor information SI designated by the designation information, of the sensor information SI obtained in the past and managed by the management server 53, the operation status of the apparatus or the like designated by the designation information of the automated warehouse system 100, and/or the generation of the problem report. In the following description, the methods of providing the sensor information SI described above are described.

Figure 16:
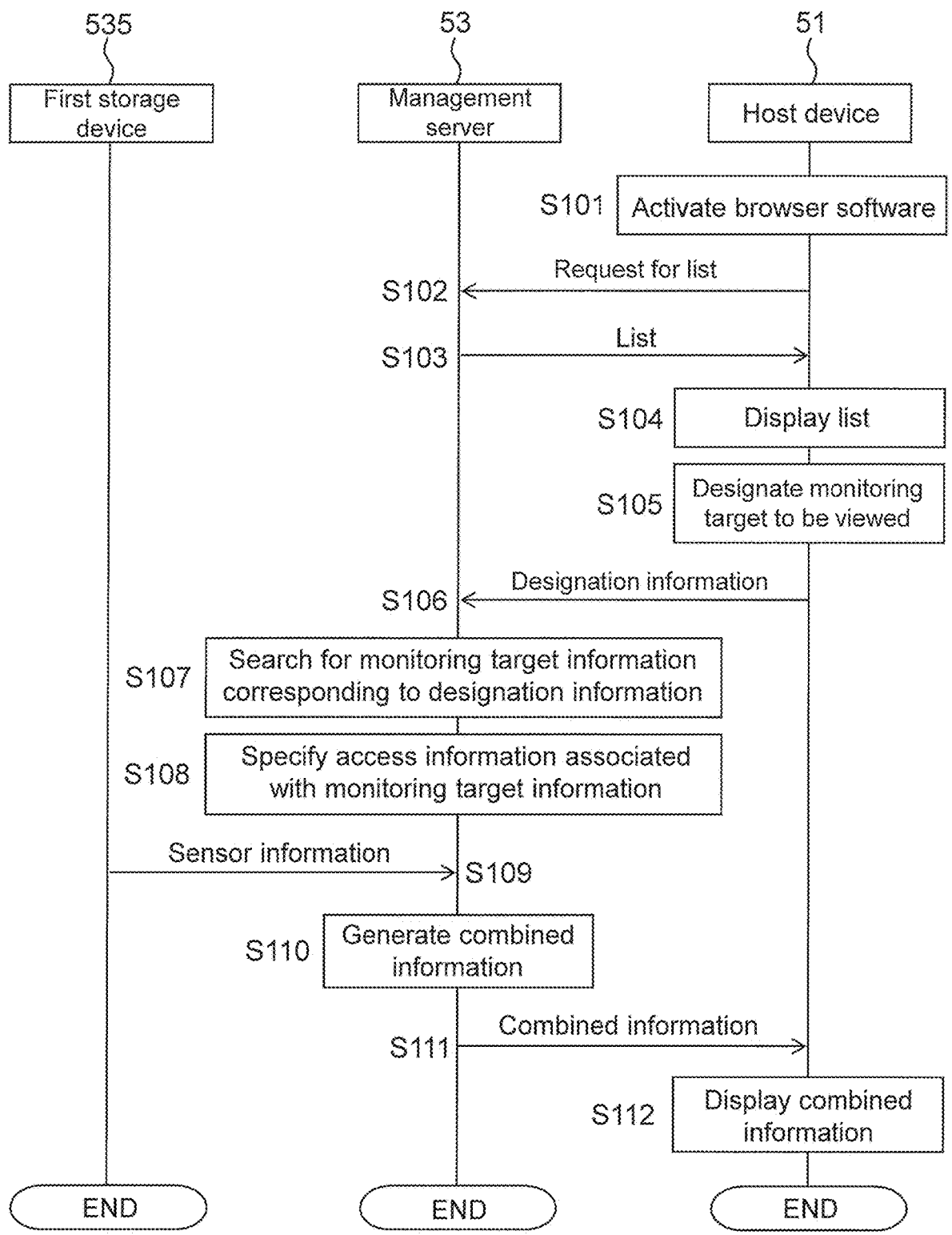
FIG. 16 is a flowchart showing a method of showing sensor information managed by the management server.

In the following description, the method of showing the sensor information SI obtained in the past and managed by the management server 53 is described with reference to FIG. 16. FIG. 16 is a flowchart showing the method of providing the sensor information that is managed by the management server. In the following description, a case where the host device 51 is implemented as the external terminal is exemplified, and the method of providing the sensor information SI obtained in the past is described.

First, the user activates browser software to display the sensor information SI obtained in the past by the host device 51 on the display 51S (S101). The processor 511, which is configured or programmed to execute the browser software, requests the management server 53 to send the list of the sensor information SI that is currently managed (S102).

In S102, the processor 511 may request the list of all the sensor information SI currently managed by the management server 53, i.e. all the records of the monitoring target database DB. Alternatively, the processor 511 may allow the user to significantly reduce the monitoring targets that are intended to be viewed via the browser software.

After receiving the request for the list described above, the management server 53 sends the records of the monitoring target database DB corresponding to the requested list to the host device 51 (S103). If the list of all the records is requested, the management server 53 sends all the records stored in the monitoring target database DB to the host device 51. On the other hand, if the user designates the monitoring targets that are intended to be displayed in the list, the records related to the designated monitoring targets are retrieved from the monitoring target database DB and sent to the host device 51.

After receiving the list (records) described above, the host device 51 displays the received list on the display 515 as shown in FIG. 17 (S104). In the example shown in FIG. 17, there are displayed date and time at which the problem (error) occurred in the automated warehouse system 100 (occurrence date and time), a section where the problem occurred (facility section), a block that controls the section (control block), content of a specific problem (abnormality content), and buttons to view the sensor information SI obtained when the problem occurred (which are displayed in the column of "image"). FIG. 17 is a diagram showing one example of a display screen when the list of the monitoring targets is displayed.

The list display as shown in FIG. 17 may include, in addition to the above, for example, a display of information, for example, the identification information of the parcel A, the bucket BK, and the pallet PL, and a product number, a product name, a shipping destination, and shipping date and time of the parcel A. Accordingly, it is easier to select the monitoring targets of which the sensor information SI is intended to be viewed.

After displaying the list on the display 515 of the host device 51, the user of the host device 51 clicks the button (image) displayed in the column of "image" of the list display, for example, to designate the monitoring target of which the sensor information SI is intended to be viewed (S105).

The processor 511 of the host device 51 sends information about the monitoring targets associated with the list designated by the user, to the management server 53, as the designation information (S106). The designation information may include the monitoring target information MI and the time information TI out of information included in one record of the monitoring target database DB, or may include only information of a portion of the monitoring target information MI and/or the time information TI.

The information to be included in the designation information is able to be appropriately determined based on search efficiency of the monitoring target database DB in the management server 53, for example.

After receiving the designation information described above, the processor 531 of the management server 53 searches the monitoring target database DB to find the monitoring target information MI corresponding to the received designation information (S107). Specifically, a record including the monitoring target information MI and/or the time information TI matching the information included in the designation information is retrieved from the records stored in the monitoring target database DB.

After retrieving the monitoring target information MI and/or the time information TI corresponding to the designation information, the processor 531 of the management server 53 identifies the access information AI associated with the monitoring target information MI or the like (S108).

After that, according to the access information AI and, optionally, the storage device management information HMI, the processor 531 identifies the host name and/or the network address of the first storage device 535 storing the sensor information SI of the monitoring target indicated in the monitoring target information MI corresponding to the designation information, and the directory name (relative path) of the first storage device 535.

The processor 531 accesses the identified directory in the identified first storage device 535 via the network interfaces 534 and 5351, and downloads the sensor information SI stored in the directory (S109). Accordingly, the management server 53 is able to obtain the sensor information SI about the monitoring target designated by the designation information from the first storage device 535.

Note that the downloaded sensor information SI is stored in a cache area, a temporal storage area, or the like of the second storage device 536, for example.

After that, the processor 531 combines the monitoring target information MI corresponding to the designation information with the sensor information SI associated with the monitoring target information MI, i.e. the sensor information SI obtained in S109, to generate the combined information FI (S110).

In the first preferred embodiment, if the sensor information SI that is intended to be viewed is the image data, for example, a still image or a moving image, the processor 531 overlays contents of the monitoring target information MI on the sensor information SI as the image data, to generate the combined information FI in which the monitoring target information MI is visually displayed with character information.

Further, if the sensor information SI that is intended to be viewed is the moving image data, the processor 531 generates the combined information FI and the monitoring target information MI about the monitoring target is provided as an overlaid display at the timing when the monitoring target is displayed in the moving image data.

Figure 18:
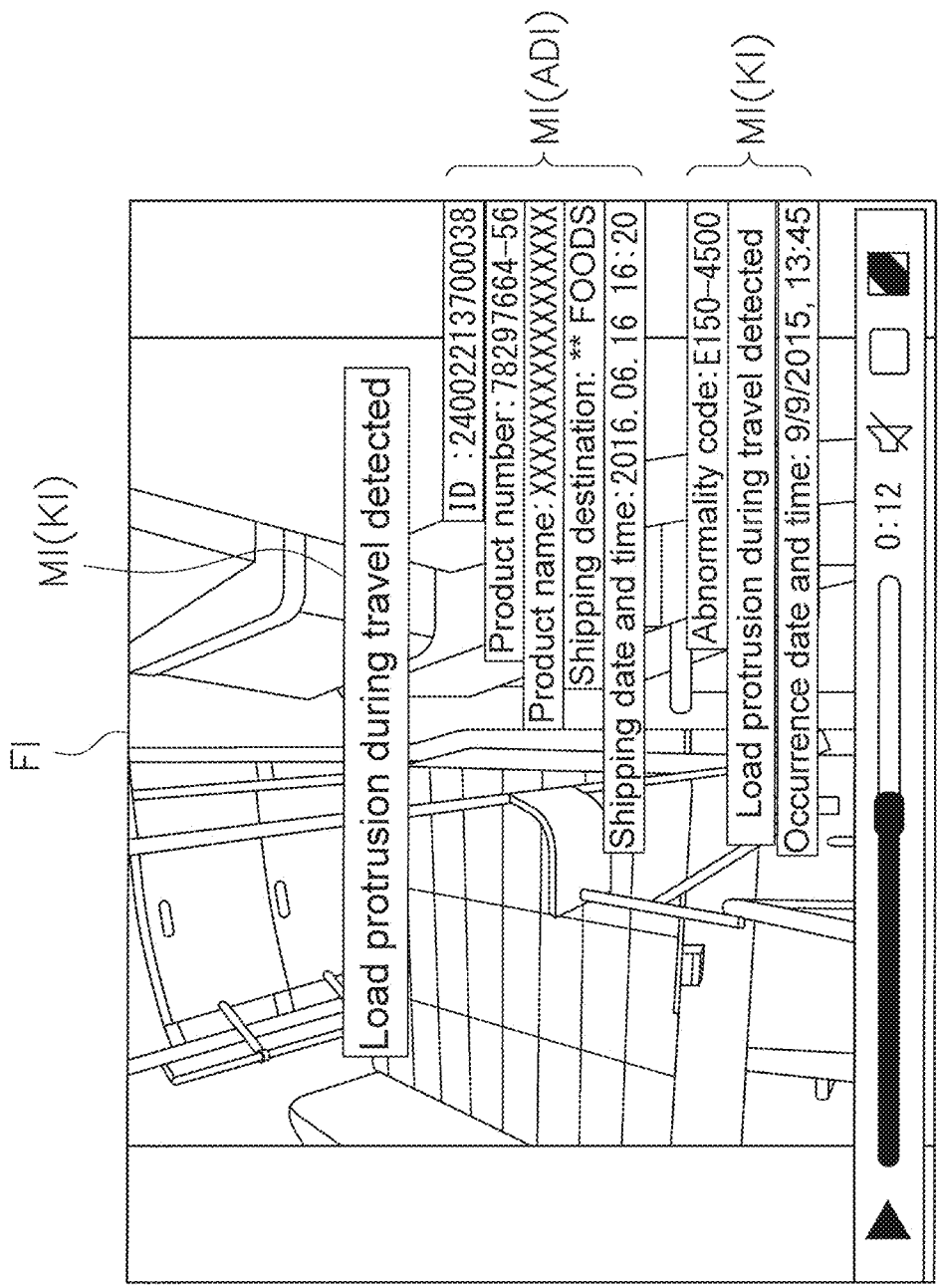
FIG. 18 is a diagram showing one example of combined information generated by overlaying monitoring target information on moving image data.

Specifically, for example, the processor 531 executes the image processing software to overlay the image showing the character information of the monitoring target information MI about the predetermined monitoring target on the frame showing the predetermined monitoring target in the sensor information SI, and thus is able to generate the combined information FI as shown in FIG. 18. FIG. 18 is a diagram showing one example of the combined information generated by overlaying the monitoring target information on the moving image data.

The combined information FI shown in FIG. 18 is a moving image indicating a state of the parcel A, the pallet PL, or the bucket BK that is being carried by the stacker crane 13. In this moving image, the identification information, a product number, a product name, a shipping destination, and shipping date and time of the parcel A that is being carried by the stacker crane 13 (or the parcel A included in the pallet PL or the bucket BK) are displayed as the monitoring target information MI (additional information ADI).

Further, in this moving image, at the timing of displaying a state where the parcel A or the like that is being carried by the stacker crane 13 protrudes from the elevating table 135 (the load protrusion error (event) occurred), highlighted character information of "Load protrusion during travel detected" is displayed as the monitoring target information MI (key information KI). Further, an error code indicating "Load protrusion during travel detected" and time at which the load protrusion occurred are displayed as the key information KI.

After generating the combined information FI as described above, the processor 531 of the management server 53 sends the generated combined information FI to the host device 51 via the network interfaces 534 and 514

(S111). After receiving the combined information FI, the host device 51 displays the combined information FI on the display 515 (S112).

Note that, when the combined information FI that is the moving image data is sent from the management server 53 to the host device 51, the host device 51 may cache a portion of the combined information FI in the storage device 517, and display the cached portion of the combined information FI on the display 515 one by one, so that the entire combined information FI is able to be displayed (streaming).

Alternatively, the host device 51 may download the entire combined information FI as the moving image data into the storage device 517, and display the combined information FI stored in the storage device 517 on the display 515.

Further, after the host device 51 displays the combined information FI, the management server 53 may promptly delete the combined information FI from the second storage device 536, or may delete after storing the combined information FI after a predetermined period of time. Alternatively, considering a possibility of reproducing the generated combined information FI in the future, it may be stored in a large capacity storage device, for example, the first storage device 535. Accordingly, it is possible to avoid a situation in which the second storage device 536 of the management server 53 is occupied by the generated combination FI and hence capacity shortage occurs.

As described above, the monitoring target information MI corresponding to the designation information designated by the user operating the host device 51 is combined with the sensor information SI associated with the monitoring target information MI, so that the combined information FI is generated and provided to the user via the host device 51. Thus, searching of the sensor information SI for the predetermined monitoring target is able to be facilitated, and a state of the monitoring target is able to be displayed with two different information (the sensor information SI and the monitoring target information MI).

Figure 19:
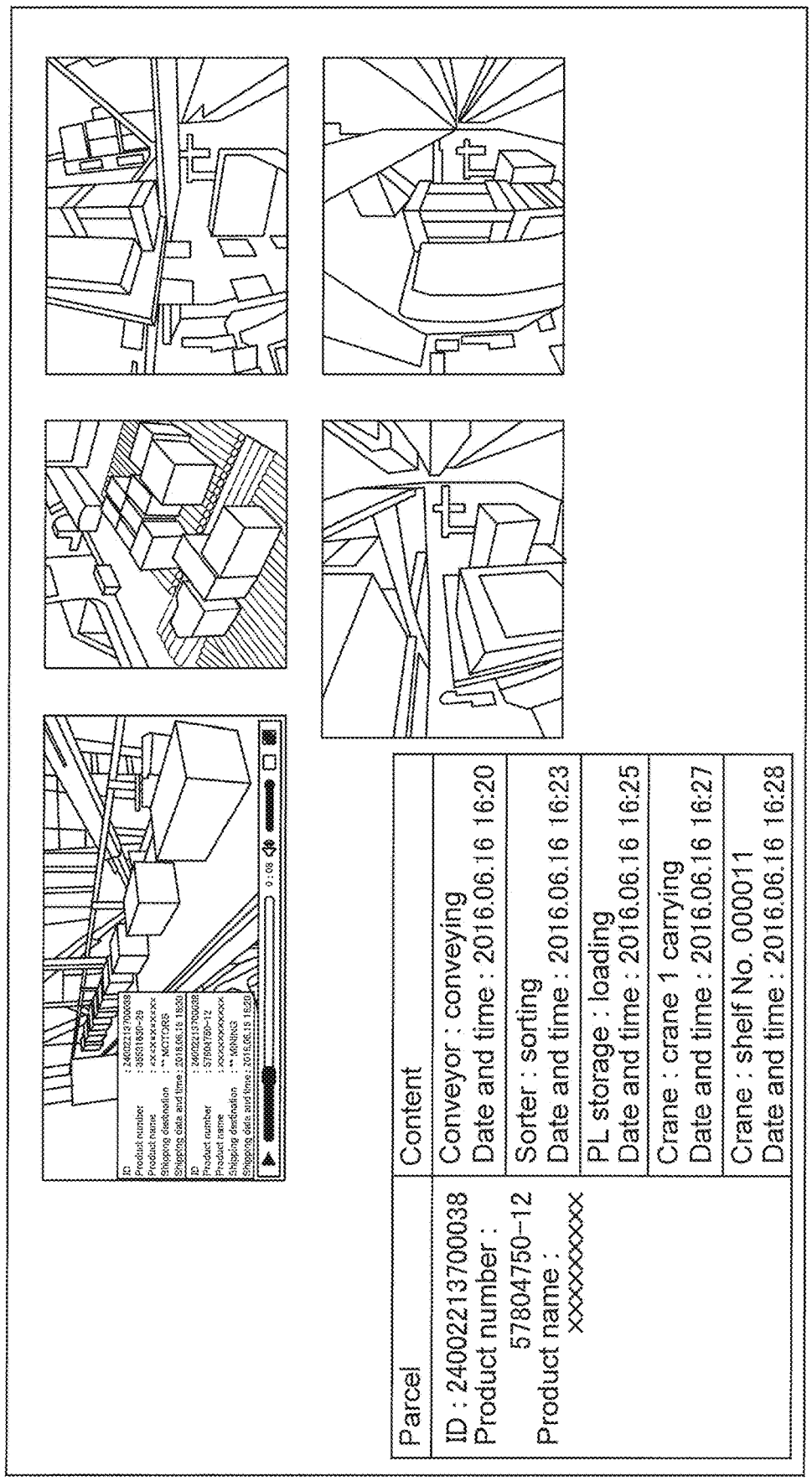
FIG. 19 is a diagram showing one example of combined information generated by combining a plurality of sensor information.

In another preferred embodiment of the present invention, for example, a plurality of corresponding monitoring target information MI may be identified for one designation information in S107 described above. In this case, as shown in FIG. 19, it may be possible to obtain from the first storage device 535 a plurality of sensor information SI corresponding respectively to the plurality of monitoring target information MI, and to combine the plurality of sensor information SI to generate one combined information FI. FIG. 19 is a diagram showing one example of the combined information generated by combining a plurality of sensor information. Accordingly, the combined information FI is able to be generated, in which a plurality of sensor information SI of the monitoring target are combined.

In this case, the corresponding monitoring target information MI may be overlaid on each of the plurality of sensor information SI. Accordingly, details of the plurality of sensor information SI is able to be visually recognized.

Figure 20:
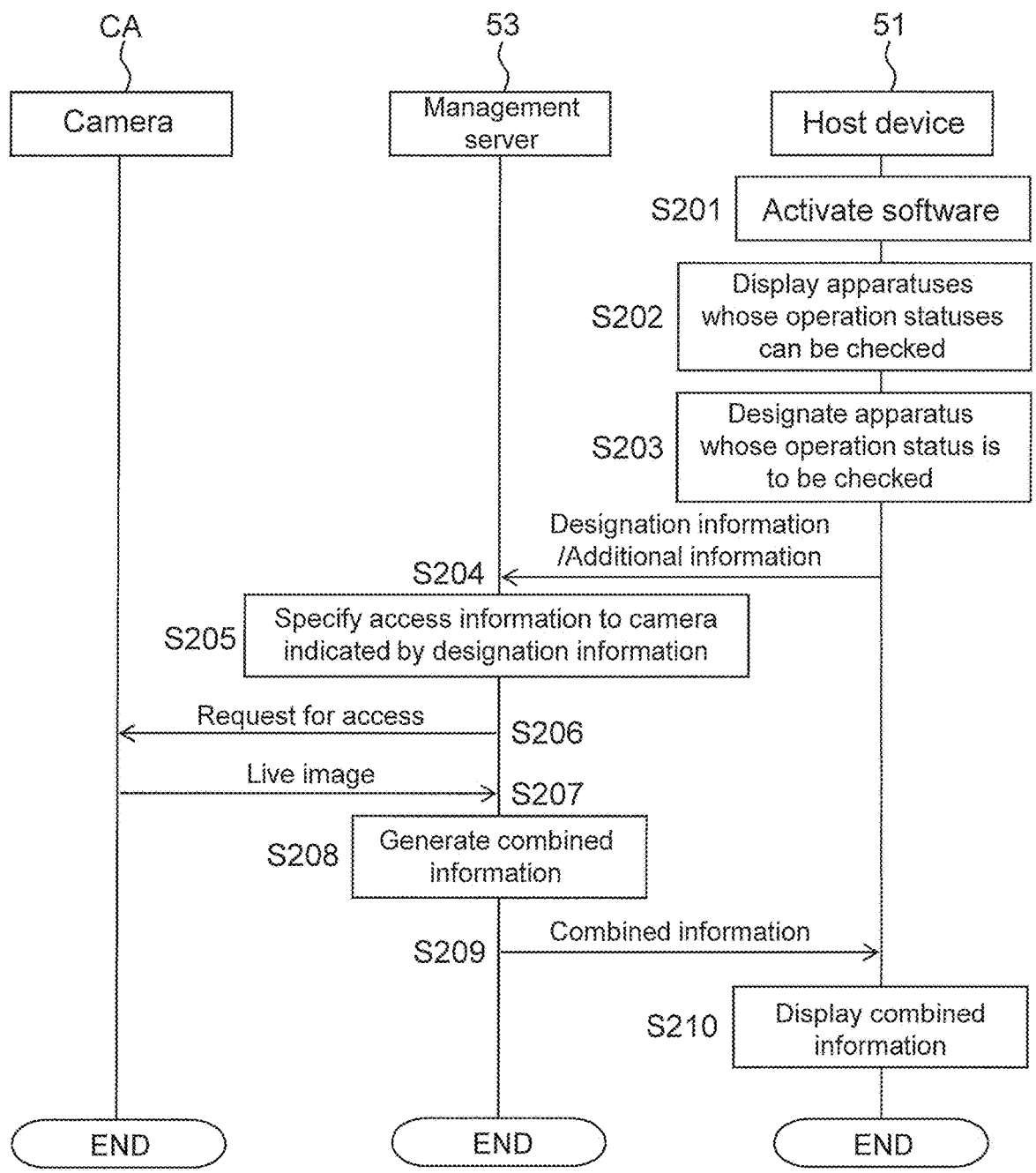
FIG. 20 is a flowchart showing a method of showing operation statuses of apparatuses or the like in the automated warehouse system.

In the following description, the method of providing the operation status of the apparatus or the like in the automated warehouse system 100 is described with reference to FIG. 20. FIG. 20 is a flowchart showing the method of providing the operation status of the apparatus or the like in the automated warehouse system.

Figure 21:
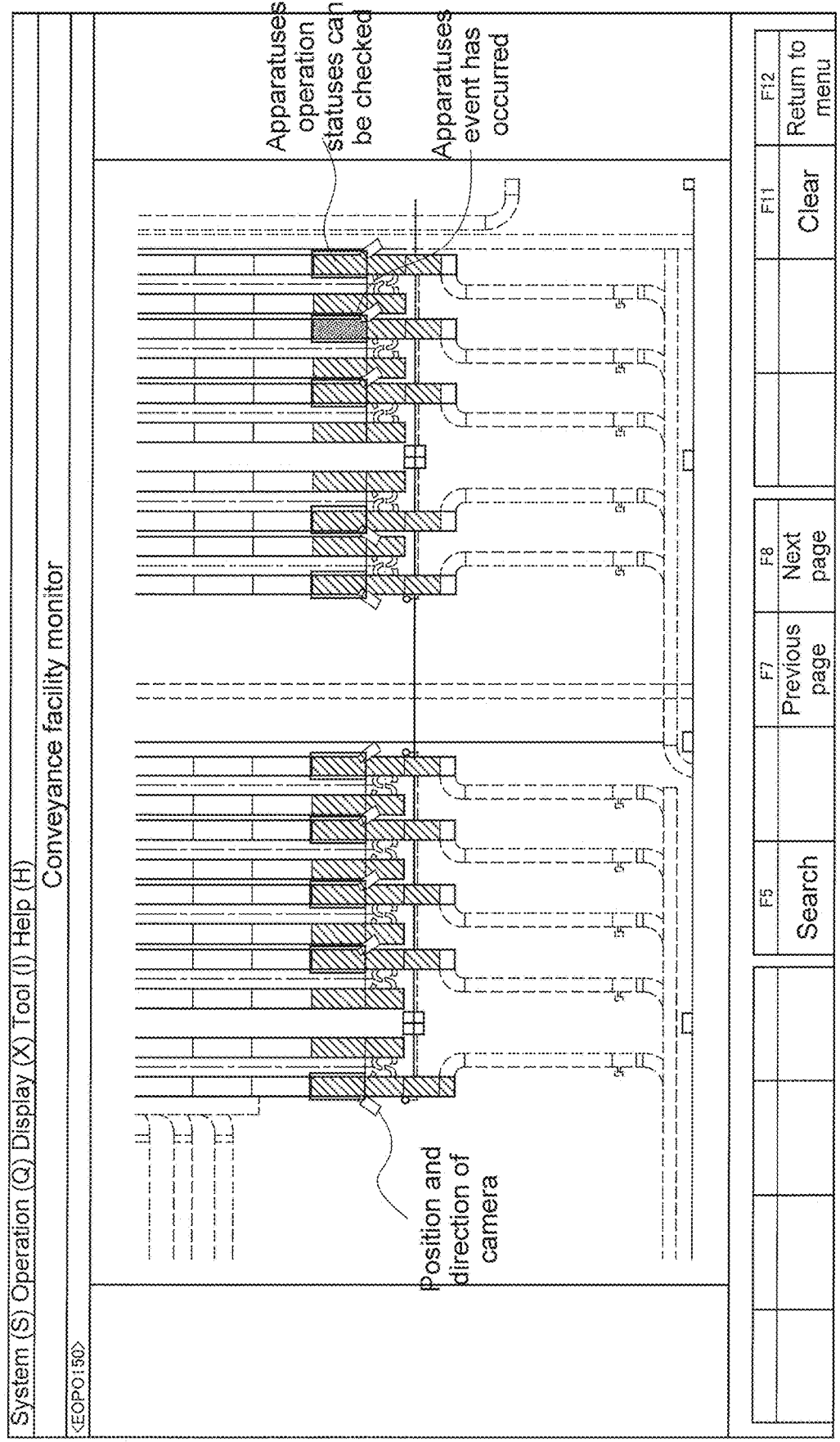
FIG. 21 is a diagram showing one example of a screen displaying apparatuses whose operation statuses are able to be checked in the automated warehouse system.

First, by operating the host device 51, the user activates software to check the operation status of the apparatus or the like in the automated warehouse system 100 (S201). When the software is executed, the display 515 displays a screen as shown in FIG. 21, in which the apparatuses whose operation statuses are able to be checked in the automated warehouse system 100 are displayed (S202). FIG. 21 is a diagram showing one example of a screen displaying apparatuses whose operation statuses are able to be checked in the automated warehouse system.

In the example shown in FIG. 21, the outline of the loading station 15 and the unloading station 17 and their vicinity in the automated warehouses 1a to 1g are displayed. In the example shown in FIG. 21, each of apparatuses whose operation statuses are able to be checked is emphasized with square. In this display, the loading station 15 is designated as an apparatus whose operation status is able to be checked. In this display, the apparatus emphasized with square and identification information of the camera CA that takes an image of a state of the apparatus are associated with each other.

Further, in the display shown in FIG. 21, the apparatus that has caused an event, for example, an error among the apparatuses whose operation statuses are able to be checked, is emphasized with color. Furthermore, positions and directions of the cameras are visually displayed.

On the screen described above, in which the apparatuses whose operation statuses are able to be checked are displayed, the user clicks, for example, a position (squared area) of an apparatus whose operation status is able to be checked. Accordingly, the apparatus whose operation status is intended to be checked is designated as the monitoring target (S203). Further, this click operation also identifies the camera CA that takes an image of a state of the apparatus.

When the apparatus whose operation status is intended to be checked is designated by the user, the identification information of the camera CA that takes an image of a state of the apparatus whose operation status is intended to be checked is sent to the management server 53 as the designation information and the key information KI (S204). In this case, the host device 51 sends the additional information ADI of the parcel A or the like that will be handled by the apparatus whose operation status is intended to be checked (for example, the identification information, a product number, a product name, a shipping destination, and shipping date and time of the parcel A, and estimated time at which the parcel A will be handled by the apparatus whose operation status is intended to be checked), to the management server 53, together with the designation information.

After receiving the designation information and the additional information ADI, the processor 531 of the management server 53 refers to the identification information of the camera CA designated by the designation information and the sensor management information SMI, to identify access information to the designated camera CA (for example, a host name, a network address, an access ID, and a password of the camera CA) (S205).

After identifying the access information to the designated camera CA, the processor 531 request the designated camera CA to provide an access (S206). Specifically, the processor 531 accesses the camera CA of the identified host name or network address via the network interfaces 534 and 5351, and sends the identified access ID and password to the camera CA.

When the access to the camera CA designated by the sent access ID and password is succeeded, a live image of the state of the apparatus whose operation status is intended to be checked is sent as the sensor information SI from the camera CA to the management server 53 (S207). In order to generate the combined information FI, the live image is temporarily stored in the first storage device 535 and/or the second storage device 536.

While receiving the live image, the processor 531 overlays contents of the additional information ADI described above on the live image, to generate the combined information FI (S208). Specifically, at the estimated time at which the parcel A will be handled by the apparatus whose operation status is intended to be checked included in the additional information ADI, the processor 531 overlays the image displaying the character information of the additional information ADI on the live image, to generate the combined information FI.

Figure 22A:
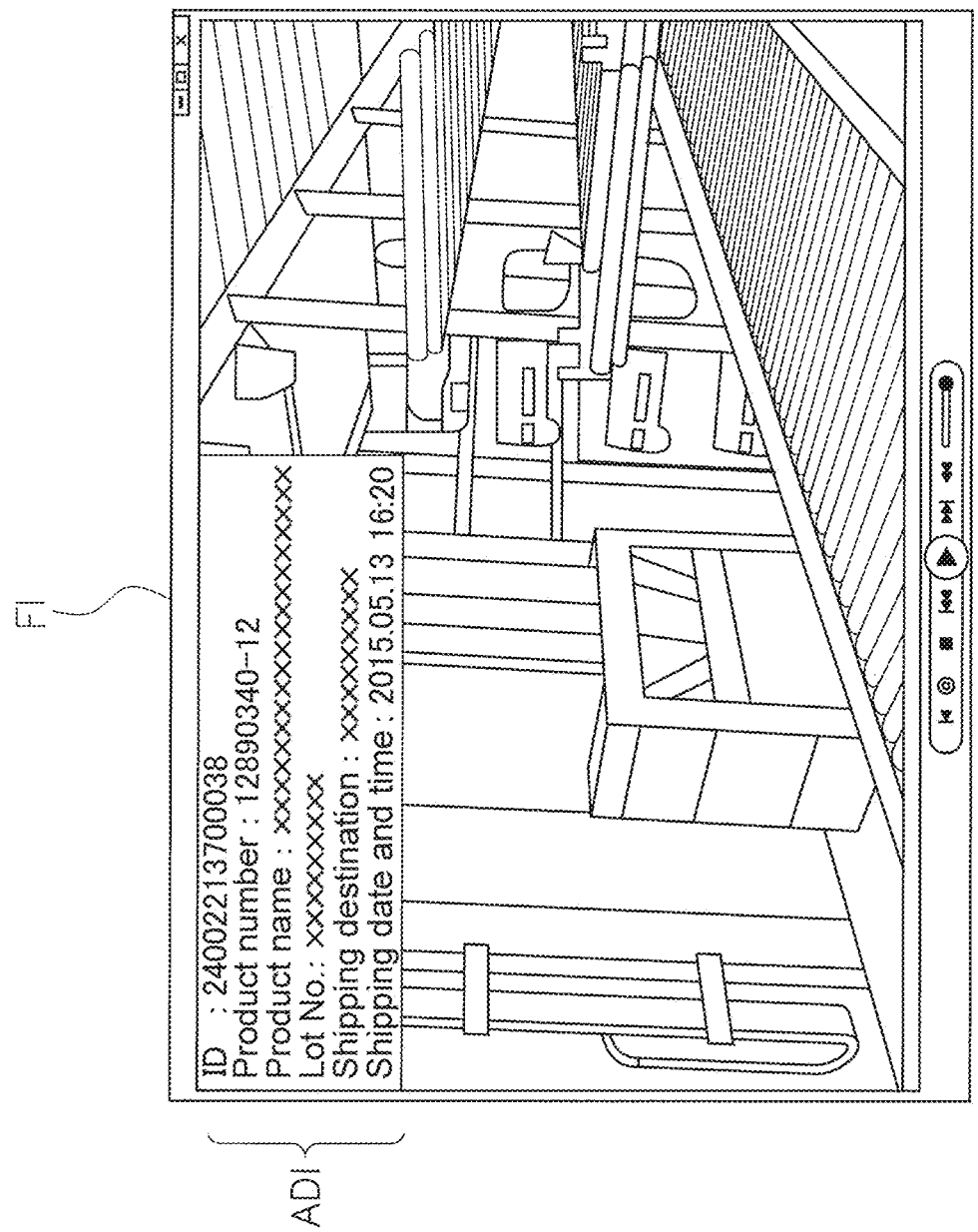
FIG. 22A is a diagram showing one example of combined information in which additional information is overlaid on a live image of an apparatus whose operation status is intended to be checked.
Figure 22B:
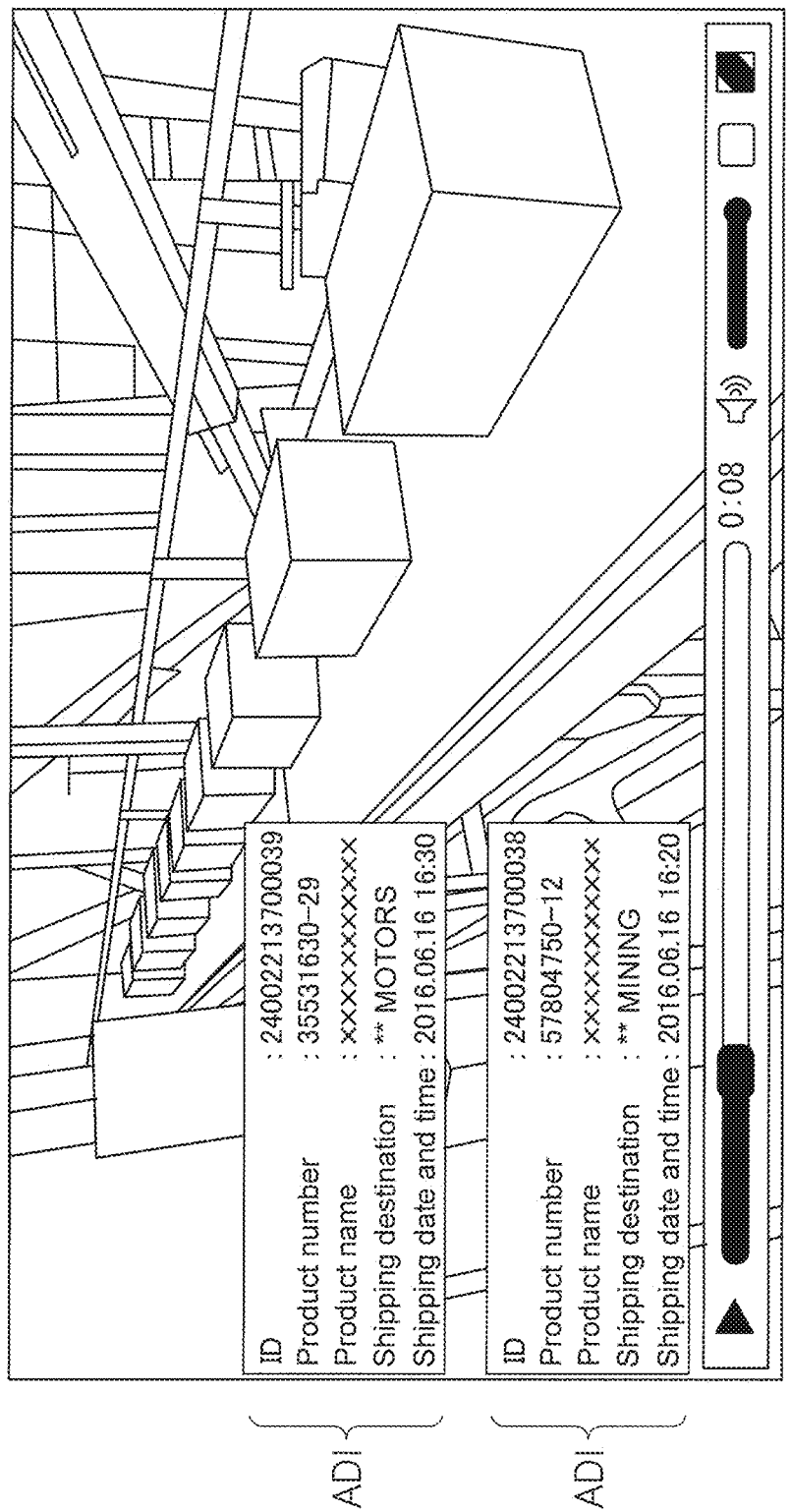
FIG. 22B is a diagram showing another example of combined information in which additional information is overlaid on a live image of an apparatus whose operation status is intended to be checked.

Accordingly, the combined information FI as shown in FIGS. 22A and 22B are generated, in which the contents of the additional information ADI is overlaid on the live image of the apparatus whose operation status is intended to be checked. FIG. 22A is a diagram showing one example of the combined information in which the additional information is overlaid on the live image of the apparatus whose operation status is intended to be checked. FIG. 22B is a diagram showing another example of the combined information in which the additional information is overlaid on the live image of the apparatus whose operation status is intended to be checked.

In the example of FIG. 22A, the identification information, a product number, a product name, a lot number, a shipping destination, and shipping date and time of the parcel A that will be carried by the stacker crane 13 are overlaid on the live image of the loading station 15 and the stacker crane 13 existing at the loading station 15. On the other hand, in the example of FIG. 22B, the identification information, a product number, a product name, a shipping destination, and shipping date and time of the parcel A, which is being conveyed by the conveyor, is overlaid on the live image showing the operation status of the conveyor provided to the automated warehouse system 100.

After generating the combined information FI as described above, the processor 531 of the management server 53 sends the generated combined information FI to the host device 51 via the network interfaces 534 and 514 (S209). After receiving the combined information FI, the host device 51 displays the combined information FI on the display 515 (S210).

Accordingly, the live image of the apparatus whose operation status is intended to be checked (monitoring target) designated by the user operating the host device 51 and the information (additional information ADI) of the parcel A or the like handled by the apparatus are combined to generate the combined information FI and to provide it to the user via the host device 51. Thus, the operation status of the predetermined monitoring target is able to be displayed with two different information (the sensor information SI and the additional information ADI).

Figure 23:
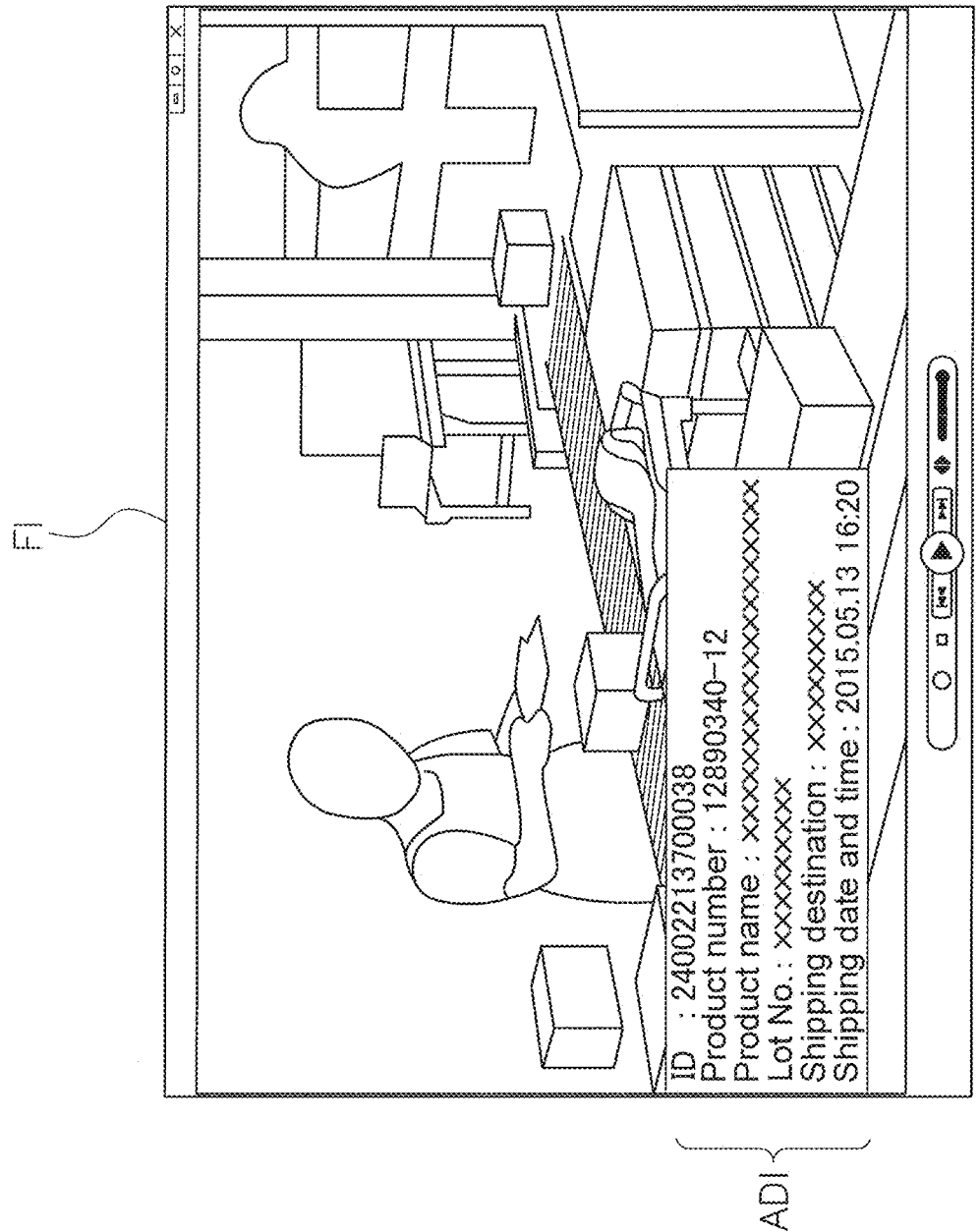
FIG. 23 is a diagram showing one example of combined information in which additional information is overlaid on a live image of a worker whose working status is intended to be checked.

Note that in the above description, the case where the operation status of the apparatus provided to the automated warehouse system 100 is checked is described, but the object whose status is able to be checked on the live image is not limited to the apparatus. For example, in S203 described above, the camera CA (the identification information thereof) located at the section where the worker W is working may be the designation information. Accordingly, for example, as shown in FIG. 23, a live image of a working status of the worker W and the additional information ADI of the parcel A that is being handled by the worker W may be overlaid to generate the combined information FI and to provide it to the user via the host device 51. FIG. 23 is a diagram showing one example of the combined information in which the additional information is overlaid on the live image of the worker whose working status is intended to be checked.

Figure 24:
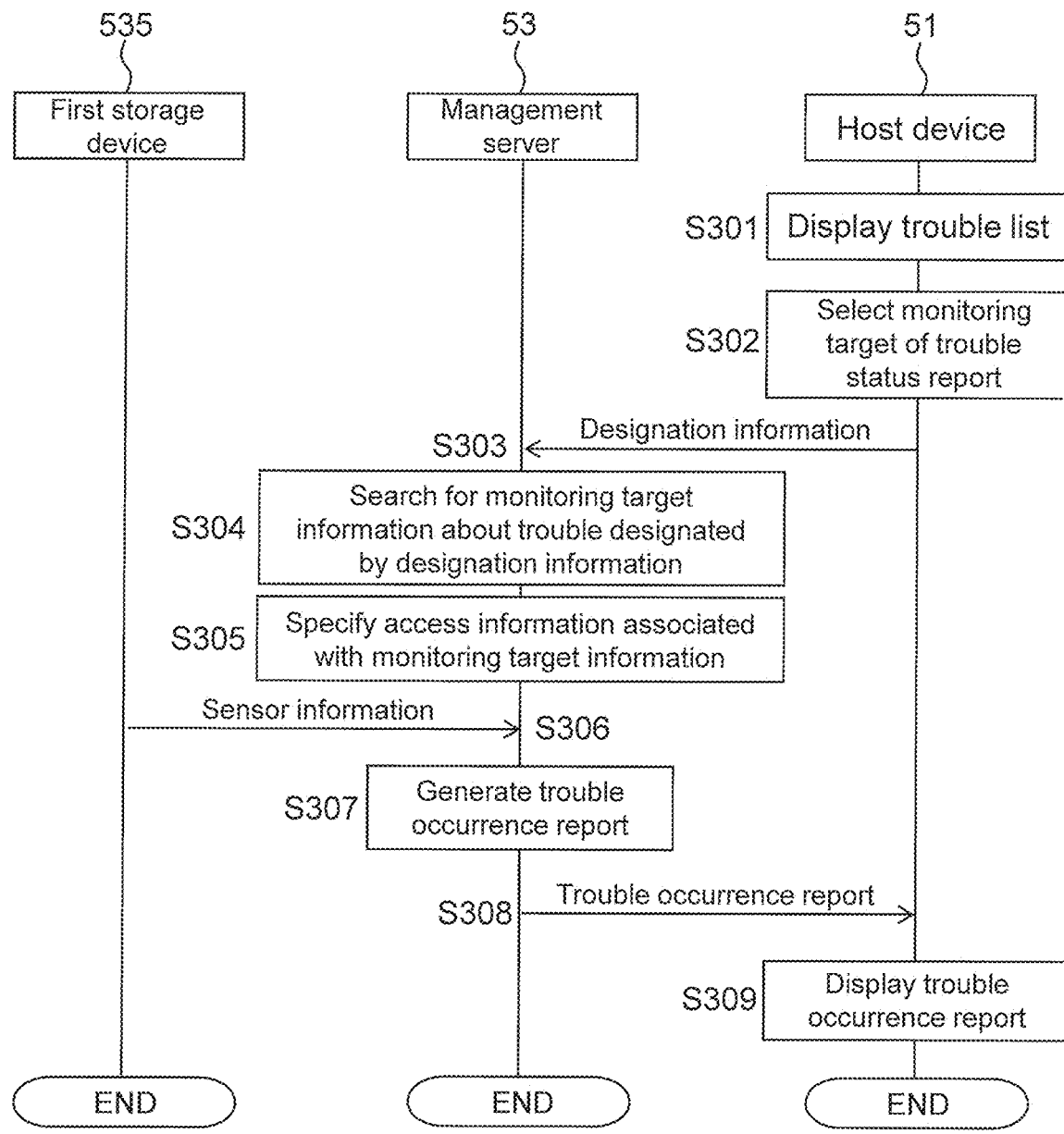
FIG. 24 is a flowchart showing a method of generating a problem status report from sensor information managed by the management server.

In the following description, there is described a method of generating a problem status report from the sensor information SI managed by the management server 53, and providing the sensor information SI, with reference to FIG. 24. FIG. 24 is a flowchart showing the method of generating the problem status report from the sensor information SI managed by the management server. When generating the problem status report, a problem that occurred in the automated warehouse system 100 is the monitoring target.

First, on the host device 51, the user activates a program to set a type of the problem (monitoring target) of which the problem status report is to be generated. The processor 511 that executes this program displays a list of problems of which the problem status report is able to be generated on the display 515 (S301).

Next, the user selects a problem type of which the problem status report is to be generated from this list (S302). The processor 511 of the host device 51 sends the problem type selected by the user to the management server 53, as the designation information (S303).

After receiving the designation information, the processor 531 of the management server 53 searches the monitoring target database DB to find the monitoring target information MI about the problem type designated by the received designation information (S304). Specifically, among the records stored in the monitoring target database DB, the record including the monitoring target information MI including the problem type designated by the designation information is found by the search.

After finding the monitoring target information MI, the processor 531 of the management server 53 identifies the access information AI associated with the monitoring target information MI (S305). After that, according to the access information AI and, optionally, the storage device management information HMI, the processor 531 identifies the host name and/or network address of the first storage device 535 storing the sensor information SI in which the designated problem type is the monitoring target, and the directory name (relative path) of the first storage device 535.

The processor 531 accesses the identified directory in the identified first storage device 535 via the network interfaces 534 and 5351, and downloads the sensor information SI stored in the directory (S306). Accordingly, the management server 53 is able to obtain the sensor information SI to be included in the problem status report from the first storage device 535.

The processor 531 combines the monitoring target information MI including the designated problem type with the sensor information SI obtained in S305, to generate the problem status report as the combined information FI (S307).

Specifically, in a fixed format of the problem status report that is prepared in advance, information among information included in the monitoring target information MI described above and the sensor information SI obtained in S306 are provided, and hence the report as shown in FIG. 25A, for example, is able to be generated as the combined information FI. FIG. 25A is a diagram showing one example of the report.

Further, the processor 531 adds a problem recovery procedure as shown in FIG. 25B to the report shown in FIG. 25A to generate the problem status report. The problem recovery procedure shown in FIG. 25B is generated in advance and is stored in the first storage device 535 and/or the second storage device 536. FIG. 25B is a diagram showing one example of the problem recovery procedure.

After generating the problem status report, the processor 531 sends the generated problem status report to the host device 51 via the network interfaces 534 and 514 (S308). After receiving the problem status report, the processor 511 of the host device 51 displays the received problem status report on the display 515 (S309).

In the first preferred embodiment, when the problem type (monitoring target) of which the problem status report is to be generated is once designated in S302 and S303 as described above, the processor 531 of the management server 53 performs S304 to S307 described above every predetermined period to generate the problem status report automatically. In response to a request from the host device 51 or the like, the generated problem status report is sent to the external terminal (host device 51) that has requested.

In another preferred embodiment of the present invention, the problem status report may be generated only when the host device 51 or the like designates the monitoring target.

Accordingly, by generating the problem status report about the problem type designated by the user, details of the problem that has occurred in the automated warehouse system 100 are able to be determined.

Second Preferred Embodiment

In the case of managing the sensor information SI obtained in the loading station 15 in which the parcel A or the like is the monitoring target, in the first preferred embodiment described above, when the parcel A (pallet PL) passes the reader device RD provided to the loading station 15 so that the identification information of the parcel A (pallet PL) read by the reader device RD is sent as the key information KI, an image indicating a state of the parcel A or the like is obtained as the sensor information SI.

However, the key information KI to be a trigger to obtain the sensor information SI in the loading station 15 is not limited to the identification information of the parcel A or the like read by the reader device RD. In a second preferred embodiment of the present invention, according to the identification information of the parcel A or the like sent from the host device 51 as the key information KI, the sensor information SI is obtained, in which the parcel A or the like is the monitoring target.

Figure 26:
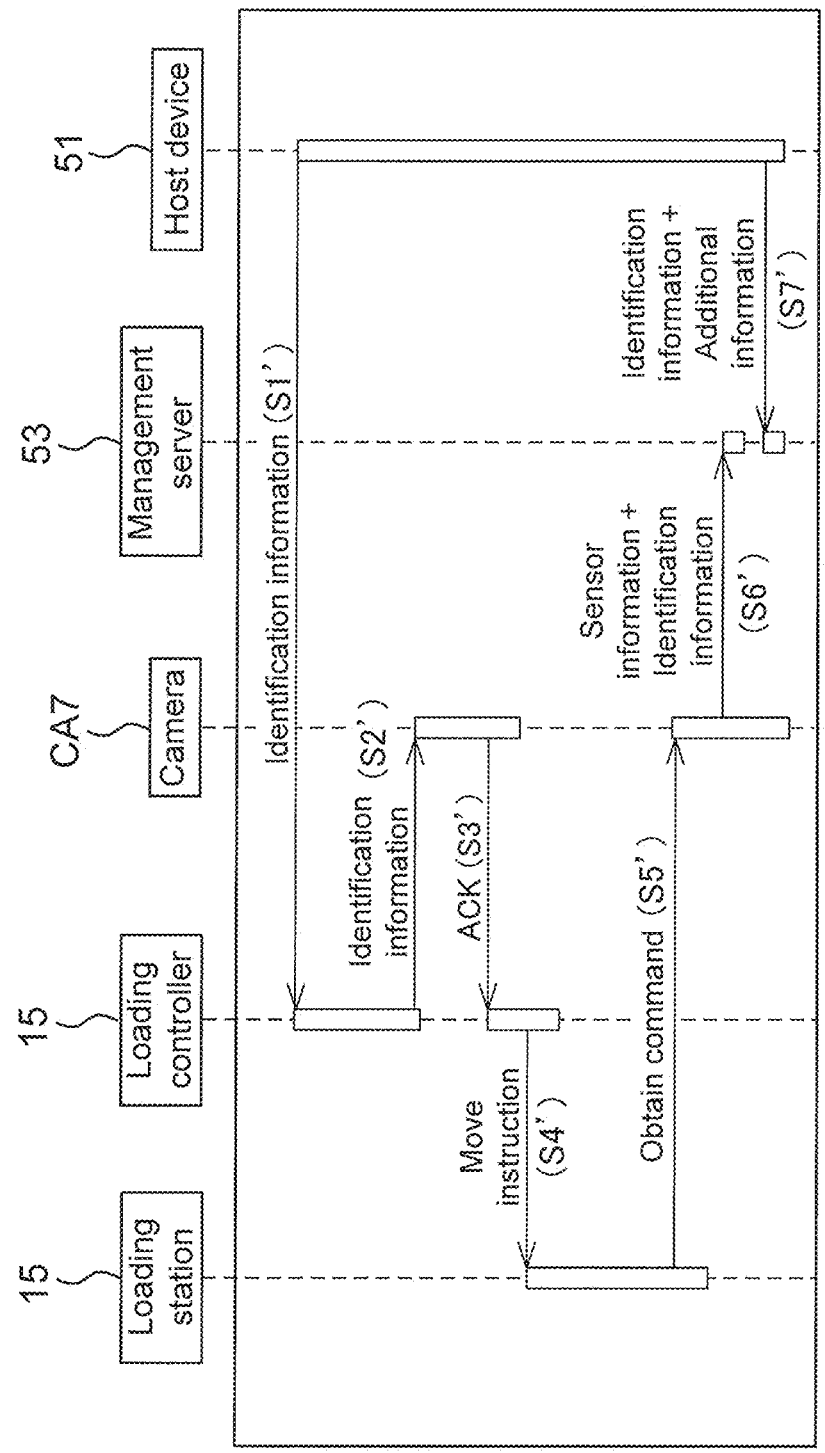
FIG. 26 is a flowchart showing one example of a method of managing sensor information in a case where a parcel or the like handled in the loading station is a monitoring target according to a second preferred embodiment of the present invention.

In the following description, there is described the method of managing the sensor information SI in the management server 53 in case where the sensor information SI is obtained in which the parcel A or the like is the monitoring target, according to the identification information of the parcel A or the like sent from the host device 51 as the key information KI, with reference to FIG. 26. FIG. 26 is a flowchart showing one example of the method of managing the sensor information in the case where the parcel or the like handled in the loading station is the monitoring target, according to the second preferred embodiment.

In the second preferred embodiment, only the method of managing the sensor information in the case where the parcel A or the like handled in the loading station 15 is the monitoring target is different from that in the first preferred embodiment, and other structures and functions of the automated warehouse system 100 are the same as or similar to those in the first preferred embodiment. Therefore, in the following description, only the method of managing the sensor information in the case where the parcel A or the like handled in the loading station 15 is the monitoring target in the second preferred embodiment is described, and the descriptions of other structures and functions of the automated warehouse system 100 are omitted.

Further, in the following description, a case where the pallet PL (and the parcel A included in the pallet PL) is the monitoring target in the loading station 15 of the automated warehouses 1e and 1f which handles the pallets PL is exemplified.

First, the worker W reads the identification information of the parcel A to be included in the pallet PL by the reader device RD or the like. Further, the worker W reads the identification information of the pallet PL including the parcel A by the reader device RD or the like. Accordingly, the identification information of the pallet PL and the identification information of the parcel A included in the pallet PL are associated with each other. The reader device RD sends the identification information of the pallet PL and the identification information of the parcel A included in the pallet PL associated with the identification information to the host device 51.

After receiving the identification information of the pallet PL, the host device 51 sends the identification information of the pallet PL as the key information KI to the (main) controller of the loading station 15 (S1'). After receiving the identification information of the pallet PL as the key information KI, the controller of the loading station 15 sends the received identification information of the pallet PL to the camera CA7 (S2').

After receiving this key information KI, the controller of the camera CA7 sends the ACK signal to the controller of the loading station 15 if the camera CA7 is able to obtain the image data (S3').

After receiving the ACK signal, the controller of the loading station 15 outputs an instruction (move instruction) to move the pallet PL to be loaded in the loading station 15 (i.e. the pallet PL of which the key information KI is the identification information), to the loading station 15 (S4'). Accordingly, the pallet PL placed on the loading station 15 starts moving to load.

When a predetermined time (e.g. time for the pallet PL to reach the position of the camera CA7) elapses after the pallet PL starts moving to load, the small controller of the loading station 15 sends the obtain command of image data of the pallet PL passing the loading station 15, to the camera CA7 (S5'). Accordingly, the image data (the still image or the moving image) of the pallet PL passing the camera CA7 is able to be obtained as the sensor information SI.

After obtaining the still image or the moving image of the pallet PL passing the camera CA7 as the sensor information SI, the controller of the camera CA7 sends the obtained sensor information SI and the identification information of the pallet PL (key information KI) obtained in S2' described above, to the management server 53 (S6').

On the other hand, the host device 51 selects the additional information ADI to be sent to the management server 53 from the identification information of the pallet PL sent in S1', and sends the selected additional information ADI to the management server 53 together with the identification information of the pallet PL (S7').

After receiving the identification information of the pallet PL (key information KI), the access information AI to the sensor information SI, and the additional information ADI, the management server 53 associates the key information KI (the identification information of the pallet PL), the additional information ADI, the access information AI, and the time information TI described above, with one another to be one record, and stores the one record in the monitoring target database DB.

Accordingly, also in the case where the identification information of the pallet PL as the key information KI is sent from the host device 51, the management server 53 is able to centrally manage the sensor information SI in the case where the particular pallet PL (and the parcel A included in the pallet PL) is the monitoring target, the additional information ADI about the particular pallet PL (and the parcel A included in the pallet PL) (for example, a product number, a product name, a shipping destination, and shipping date and time of the parcel A), and the time information TI at which the sensor information SI was obtained.

Common Features of the First and Second Preferred Embodiments

The first and the second preferred embodiments have structures and functions described below in common.

The management server 53 (one example of the management server) is a server that manages information about the automated warehouse system 100 (one example of the system) including the sensors SE and/or the cameras CA (one example of the sensors) provided at a plurality of positions. The management server 53 includes the first storage device 535 and the second storage device 536 (one example of the storage device), the network interface 534 (one example of the network interface), and the processor 531 (one example of the processor).

The network interface 534 communicates with the external device. The processor 531 is configured or programmed to perform a process including obtaining the monitoring target information MI (one example of the monitoring target information) and the sensor information SI (one example of the sensor information) via the network interface 534, and associating the monitoring target information MI, the sensor information SI, and the time information TI (one example of the time information), with one another to be stored in the storage device. The monitoring target information MI includes the key information KI (one example of the key information) that identifies the monitoring target in the automated warehouse system 100, and the additional information ADI (one example of the additional information) that is additional information about the monitoring target. The sensor information SI is data indicating a state of the monitoring target obtained by the sensor SE and/or the camera CA based on the key information KI. The time information TI is information indicating a time at which the sensor information SI was obtained.

Further, the processor 531 is configured or programmed to perform a process of obtaining the designation information from the host device 51 (one example of the external terminal) via the network interface 534, and combining the monitoring target information MI corresponding to the obtained designation information with the sensor information SI associated with the monitoring target information MI, to generate the combined information FI (one example of the combined information) and output the combined information to the host device 51 via the network interface 534. The designation information is information about the monitoring target designated by the user by the host device 51 displaying the monitoring target information MI.

In the management server 53, the sensor information SI obtained by the plurality of sensors SE and/or cameras CA provided to the automated warehouse system 100 is associated with the monitoring target information MI that is information about the monitoring target and the time information TI at which the sensor information SI was obtained, and is stored in the storage device. Further, the processor 531 is configured or programmed to combine the monitoring target information MI corresponding to the designation information designated by the user, with the sensor information SI associated with the monitoring target information MI, to generate the combined information FI and the combined information is provided to the user via the host device 51. Accordingly, searching of the sensor information SI for the predetermined monitoring target is able to be facilitated, and a state of the monitoring target is able to be displayed with two different information (the sensor information SI and the monitoring target information MI).

Other Preferred Embodiments

Although a plurality of preferred embodiments of the present invention are described above, the present invention is not limited to the above preferred embodiments but may be variously modified in the scope of the invention without deviating from the scope thereof. In particular, the plurality of preferred embodiments and variations described in this specification may be arbitrarily combined.

The management server 53 of the first preferred embodiment or the second preferred embodiment may also be applied to a system other than the automated warehouse system 100. For example, it may be applied to a machining system, an analyzing system, a semiconductor conveying system, and the like.

In the first preferred embodiment and the second preferred embodiment, the storage device of the management server 53 is defined by the external first storage device 535 and the internal second storage device 536, but this is not a limitation. For example, if the storage capacity of the computer system defining the management server 53 is sufficiently large in such a case where the management server 53 is a large scale computer system or the like, or if the storage device is able to be easily added to the computer system, it may be unnecessary to provide an external storage device.

The first storage device 535 according to the first preferred embodiment or the second preferred embodiment may be a cloud server that has a large capacity storage area and is accessible via a wide area network, for example, the Internet. Accordingly, the management server 53 is able to manage a large amount of sensor information SI. Further, if the first storage device 535 is a cloud server, it is also possible, for example, to manage the sensor information SI of the automated warehouse system 100 installed in another site. As a result, the host device 51 is able to display on the display 515 the sensor information SI obtained at the another site, too.

Note that a preferred embodiment the present invention may also be implemented as a system, as described below.

A management system manages a system including sensors located at a plurality of positions, the management system including a host device that controls the system, and a management server that manages information about the system. The management server includes a storage device or memory, a network interface that communicates with an external device, and a processor. The processor is configured or programmed to perform a process including receiving monitoring target information and sensor information via the network interface, the monitoring target information including key information and additional information, the key information identifying a monitoring target in the system, the additional information being additional information about the monitoring target, and the sensor information indicating a state of the monitoring target obtained by the sensor based on the key information; associating the monitoring target information, the sensor information, and time information with one another to be stored in the storage device, the time information indicating a time at which the sensor information is received; receiving designation information from the host device via the network interface, the designation information being information about the monitoring target designated by the user by the external terminal displaying the monitoring target information; and combining the monitoring target information corresponding to the designation information with the sensor information associated with the monitoring target information, to generate combined information and output the combined information to the host device via the network interface.

Preferred embodiments of the present invention may be widely applied to management servers that manage information about a system including sensors located at a plurality of positions.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A management server that manages information about a system including sensors located at a plurality of positions, the management server comprising:
   a storage;
   a network interface to communicate with an external device; and
   a processor configured or programmed to perform a process including:
   receiving monitoring target information and sensor information via the network interface, the target information including key information and additional information, the key information identifying a monitoring target in the system, the additional information being additional information about the monitoring target, and the sensor information indicating a state of the monitoring target obtained by the sensor based on the key information;
   associating the monitoring target information, the sensor information, and time information with one another to be stored in the storage, the time information indicating a time at which the sensor information is received;
   receiving designation information from an external terminal via the network interface, the designation information being information about the monitoring target designated by the user operating the external terminal displaying the monitoring target information; and
   combining the monitoring target information corresponding to the designation information with the sensor information associated with the monitoring target information to generate combined information and output the combined information to the external terminal via the network interface.

2. The management server according to claim 1, wherein the sensor information includes image data obtained by taking an image of a state of the monitoring target; and
   the processor is configured or programmed to overlay the monitoring target information on the image data to generate the combined information.

3. The management server according to claim 2, wherein the image data is moving image data;
   the processor is configured or programmed to generate the combined information; and
   the monitoring target information about the monitoring target is overlaid and displayed at timing when the monitoring target is displayed on the moving image data.

4. The management server according to claim 3, wherein the monitoring target is an event that occurred in the system; and
   the moving image data includes only a portion of data obtained by taking an image of a state before and after the event that is the monitoring target.

5. The management server according to claim 1, wherein the storage includes an external first storage and a second storage, the external first storage being accessible via the network interface and store the sensor information;
   the processor is configured or programmed to:
   associate the monitoring target information, access information, and the time information, with one another to be stored in the second storage, the access information indicating a location of the sensor information indicating a state of the monitoring target indicated in the corresponding monitoring target information, in the first storage; and
   combine the sensor information obtained from the first storage according to the access information with the monitoring target information to generate the combined information.

6. The management server according to claim 1, wherein the monitoring target is a problem that occurred in the system; and
   the processor is configured or programmed to generate a problem status report as the combined information, according to the monitoring target information about the problem and the sensor information associated with the monitoring target information.

7. The management server according to claim 1, wherein the processor is configured or programmed to combine a plurality of the sensor information to generate the combined information.

8. A management system that manages a system including sensors located at a plurality of positions, the management system comprising:
   a host controller to control the system; and
   a management server to manage information about the system;
   the management server including:
   a storage;
   a network interface to communicate with an external device; and
   a processor configured or programmed to perform a process including:
   receiving monitoring target information and sensor information via the network interface, the target information including key information and additional information, the key information identifying a monitoring target in the system, the additional information being additional information about the monitoring target, and the sensor information indicating a state of the monitoring target obtained by the sensor based on the key information;
   associating the monitoring target information, the sensor information, and time information with one another to be stored in the storage, the time information indicating a time at which the sensor information is received;
   receiving designation information from the host controller via the network interface, the designation information being information about the monitoring target designated by the user operating an external terminal displaying the monitoring target information; and combining the monitoring target information corresponding to the designation information with the sensor information associated with the monitoring target information to generate combined information and output the combined information to the host controller via the network interface.

9. A method of managing information in a management server including a storage to manage information about a system including sensors located at a plurality of positions, the method comprising:

receiving monitoring target information and sensor information, the target information including key information and additional information, the key information identifying a monitoring target in the system, the additional information being additional information about the monitoring target, and the sensor information indicating a state of the monitoring target obtained by the sensor based on the key information;

associating the monitoring target information, the sensor information, and time information with one another to be stored in the storage, the time information indicating a time at which the sensor information is received;

receiving designation information from an external terminal, the designation information being information about the monitoring target designated by the user operating the external terminal displaying the monitoring target information; and combining the monitoring target information corresponding to the designation information with the sensor information associated with the monitoring target information to generate combined information and output the combined information to the external terminal.

10. A non-transitory computer readable medium including a program that causes a computer to perform the method according to claim 9.

* * * * *